United States Patent
George, II et al.

(10) Patent No.: US 9,311,833 B2
(45) Date of Patent: Apr. 12, 2016

(54) TRAILER WITH DISPLAY SCREEN STORAGE AND SUPPORT

(71) Applicants: Ken George, II, Canfield, OH (US); Thomas Nuttall, Poland, OH (US); Tim Cooper, Poland, OH (US); Tom Andres, Canfield, OH (US); Carl Carbon, Poland, OH (US)

(72) Inventors: Ken George, II, Canfield, OH (US); Thomas Nuttall, Poland, OH (US); Tim Cooper, Poland, OH (US); Tom Andres, Canfield, OH (US); Carl Carbon, Poland, OH (US)

(73) Assignee: Trailex, Inc. OH (US)

( * ) Notice: Subject to any disclaimer, the term of this patent is extended or adjusted under 35 U.S.C. 154(b) by 425 days.

(21) Appl. No.: 13/771,202

(22) Filed: Feb. 20, 2013

(65) Prior Publication Data
US 2014/0232947 A1 Aug. 21, 2014

(51) Int. Cl.
| G09F 21/04 | (2006.01) |
| G09F 9/302 | (2006.01) |
| G09F 9/30 | (2006.01) |
| G09F 15/00 | (2006.01) |
| B60R 13/00 | (2006.01) |

(52) U.S. Cl.
CPC ............... *G09F 9/3026* (2013.01); *G09F 9/30* (2013.01); *G09F 15/0037* (2013.01); *G09F 15/0062* (2013.01); *G09F 15/0068* (2013.01); *G09F 21/04* (2013.01); *B60R 13/00* (2013.01)

(58) Field of Classification Search
CPC ................................ G09F 21/04; B60R 13/00
USPC .............. 40/590, 601, 591, 588, 589, 607.04, 40/624, 613, 612, 610, 571; 345/55, 59; 240/815.4
See application file for complete search history.

(56) References Cited

U.S. PATENT DOCUMENTS

| 4,110,792 | A | * | 8/1978 | Long et al. .................... 348/383 |
| 4,782,615 | A | * | 11/1988 | Futatsuishi et al. ............. 40/591 |
| 5,423,142 | A | * | 6/1995 | Douglas et al. ................. 40/605 |
| 6,101,750 | A | * | 8/2000 | Blesener ................. G09F 13/04 340/815.53 |

* cited by examiner

*Primary Examiner* — Syed A Islam
(74) *Attorney, Agent, or Firm* — H. Jay Spiegel

(57) ABSTRACT

A trailer with display screen storage and support includes infrastructure necessary to store, support and adjust the position and orientation of a large display screen displaying audio/video programming. The trailer has a bed facilitating storage of screen sections on one side of a telescoping support. A portion of the roof is attached to the telescoping support so the telescoping support emerges from within the trailer by lifting the roof portion integrated with the telescoping support. The screen display is separable into top and bottom halves, the top half affixed to the telescoping support and the bottom half separable from the top half and laterally movable to and from a storage position and to and from a position at which it may be releasably connected to the top half of the screen display. The screen display may have ends pivotable from extended to retracted configurations with respect to a center section.

13 Claims, 24 Drawing Sheets

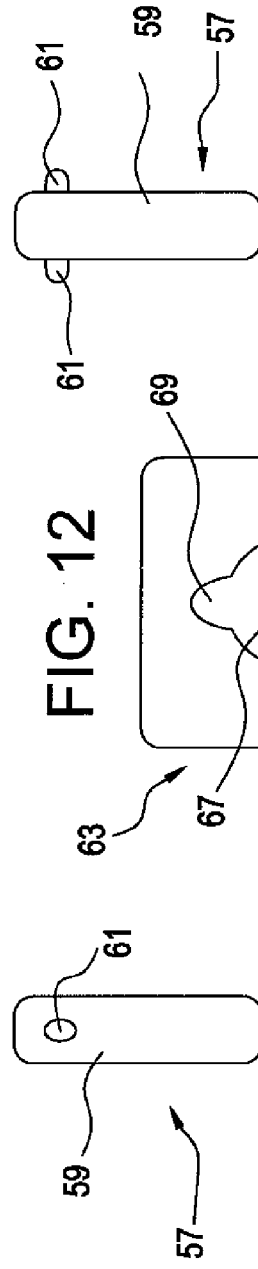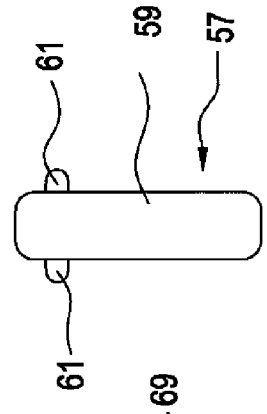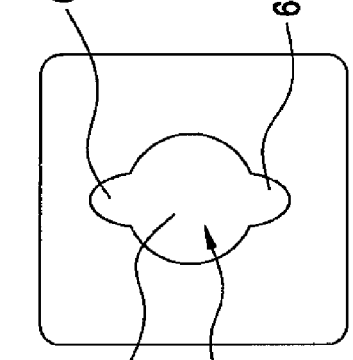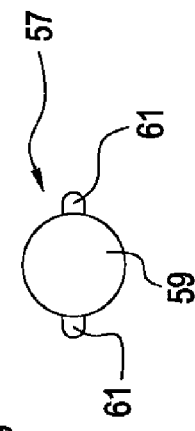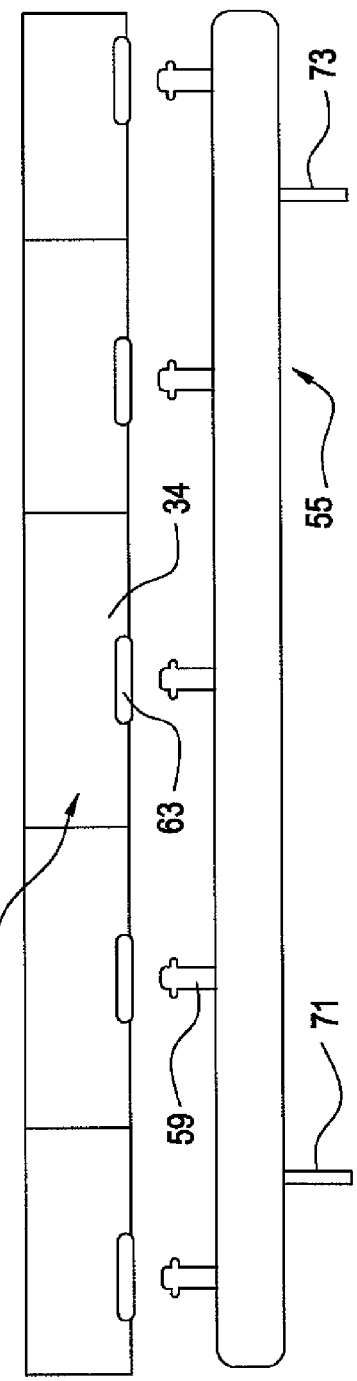

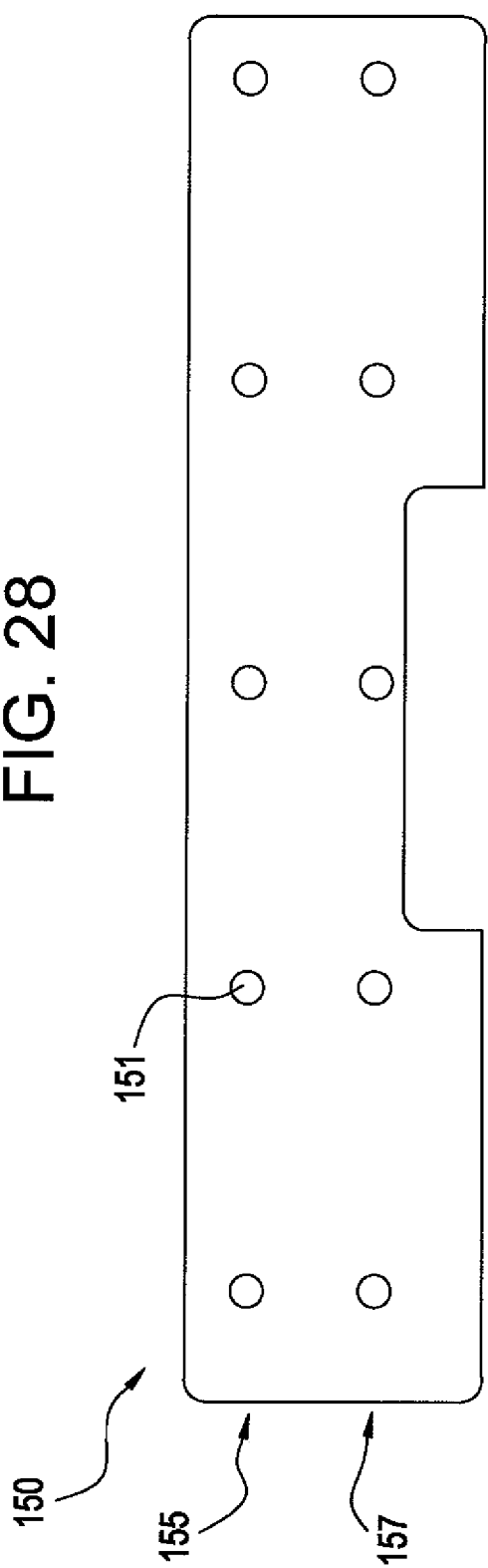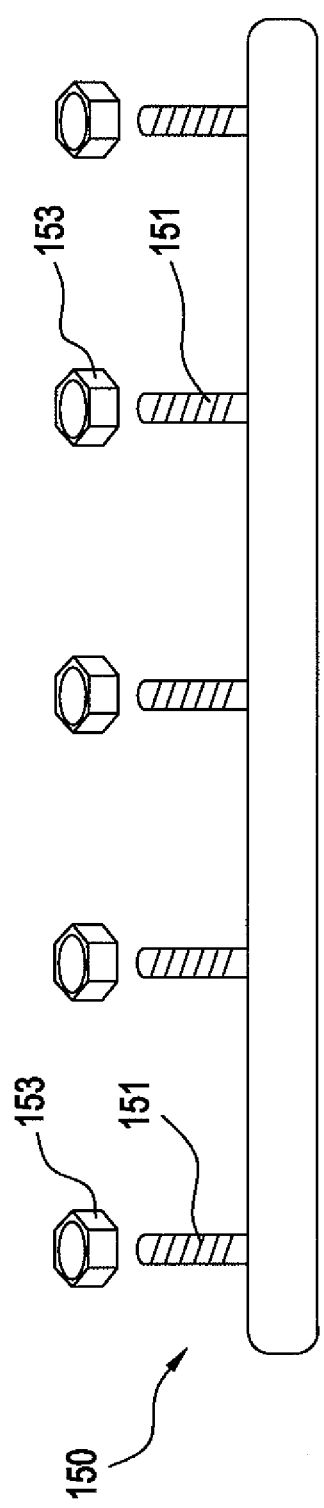

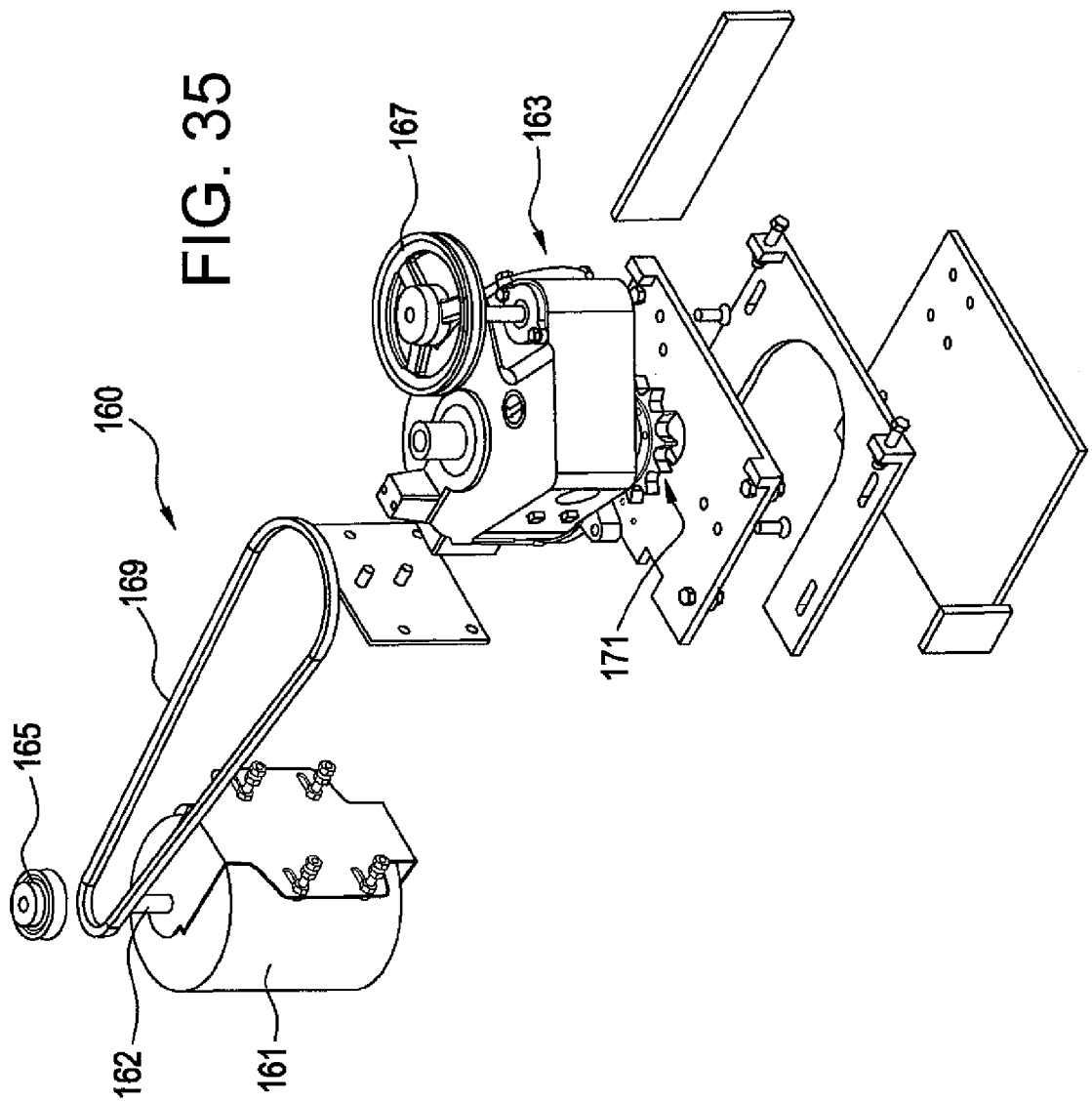

TRAILER WITH DISPLAY SCREEN STORAGE AND SUPPORT

BACKGROUND OF THE INVENTION

The present invention relates to a trailer with display screen storage and support. The present invention contemplates the ability to store a large display screen within its enclosure and quickly and efficiently erect the display screen to be used, for example, in concerts, conventions, and the like.

In the prior art, it is known to store a display screen on a trailer and to erect the display screen when it is desired to use it. However, prior art such devices have been extremely cumbersome concerning the manner of storage, the manner of erection, and the efficiency of erection, and disassembly. In this regard, BARCO sells a trailer under the name Featherlite. In the Featherlite trailer, the screen is horizontally separable into two halves, but the manner of storage is such that the two halves are stored on opposite sides of the mast. As such, a complicated operation must be undertaken to separate the halves and then store them in their desired locations. By contrast, in the present invention, a mechanism is included that permits the two screen halves to be stored side-by-side in an easy, efficient manner.

The following prior art is known to Applicants:

U.S. Pat. No. 5,612,741 to Loban et al. discloses a video billboard that is mounted on a ground surface on two posts and includes a plurality of screen sections that combine together to display an image. The present invention differs from the teachings of Loban et al. as contemplating a display screen made of multiple sections and which may be separated into halves and stored side-by-side.

U.S. Pat. No. 6,585,201 to Reed discloses a telescoping support for a display screen. The present invention differs from the teachings of Reed as contemplating a telescoping support that supports an upper half of a multi-section display screen from above and allows separation of the screen into halves for adjacent storage.

U.S. Pat. No. 6,594,078 to Clifton et al. discloses a multi-screen display system including disclosed means for interconnecting the separate screen sections together. The present invention differs from the teachings of Clifton et al. as contemplating a multi-section screen display system that is horizontally separable, supportable on a single telescoping column, and separable into halves for adjacent storage.

U.S. Pat. No. 7,408,596 to Kunz discloses an articulating mount for an in-vehicle display in which a display screen is pivotably movable with respect to its support. The present invention differs from the teachings of Kunz as contemplating a screen made up of a multiplicity of sections and in which the screen is separable into halves for easy adjacent storage.

U.S. Pat. No. 7,466,482 to Liao discloses a display unit consisting of a support for a multiplicity of display screens that are interconnected together within the support to provide a single large display. The present invention differs from the teachings of Liao as contemplating a screen display made up of a multiplicity of different screen sections that may be interconnected together to create a display of a single integrated image and may be separated into halves for easy adjacent storage.

U.S. Pat. No. 7,499,215 to Levy discloses a display screen made up of a multiplicity of sections releasably interconnectable together. The present invention differs from the teachings of Levy as contemplating a display screen made up of a multiplicity of sections connectable together and separable into halves for easy adjacent storage.

U.S. Pat. No. 7,852,622 to Ferren et al. discloses a deployable display apparatus for a vehicle consisting of a display screen made up of two adjacent sections that may be pivoted with respect to one another and with respect to a support arm. The present invention differs from the teachings of Ferren et al. for reasons including the fact that the halves of Applicants' display screen are separable along a horizontal line as opposed to the vertical line of Ferren et al., although one of Applicants' embodiments includes the provision of pivoting of screen sections about a vertical axis, that embodiment also includes separation of display sections about a horizontal plane.

U.S. Published Application No. US 2009/0310286 A1 to Miller discloses an integrated mounting system for communication and surveillance infrastructures. The Miller device includes a trailer on which are mounted a number of devices such as antennas, cameras, sensors, photovoltaic panels, and the like. Miller fails to teach or suggest mounting a multi-section display on a trailer and the ability to separate the display into multiple sections for easy adjacent storage.

SUMMARY OF THE INVENTION

The present invention relates to a trailer with display screen storage and support. The present invention includes the following interrelated objects, aspects and features:

(1) In a first aspect, the present invention contemplates providing a trailer with the infrastructure necessary to store, support and adjust the position and orientation of a large display screen intended to display audio/video programming. Such a display screen is often used to assist attendees to an event to see what is occurring on a stage even though they are seated distant from the stage. Thus, such a device is useful to assist attendees in participating in the experience.

(2) In an important aspect of the present invention, it is essential that the screen be able to be stored in a safe and secure manner and erected quickly and efficiently when it is desired to utilize the screen to display programming material. Thus, in accordance with the teachings of the present invention, the trailer has a bed configured to facilitate storage of screen sections side-by-side.

(3) The trailer includes a complete enclosure to protect the screen sections and the telescoping support from the elements during transport and when not in use. In the preferred embodiment, a portion of the roof of the enclosure is attached to the telescoping support so that the telescoping support emerges from within the trailer by lifting the roof portion integrated with the telescoping support.

(4) In a first embodiment, the screen display is separable into top and bottom halves. The top half is affixed to the telescoping support and moves up and down with it and the roof section. The bottom half of the screen display is separable from the top half and is laterally movable to and from a storage position and to and from a position at which it may be releasably connected to the top half of the screen display. In a second embodiment, the screen display is separable into two or three sections, with the ends of those sections being pivotable from extended to retracted configurations.

(5) The lateral adjustment of the position of lower screen sections is accomplished by the provision of a spreader bar having a plurality of coupling members releasably coupled to lower edges of sections of the display that may be attached thereto. The spreader bar is reciprocable along the trailer bed by virtue of a pair of cylinders having extensible and retractable rams coupled to the spreader bar.

(6) When it is desired to couple the screen sections together, the telescoping support is activated to lift the upper screen section so that its bottom edge is slightly above the elevation of the lower screen section(s). Next, the spreader bar is reciprocated with a lower screen section coupled thereto until it is aligned under the upper screen section. Then, the upper screen section is lowered until its lower edge engages the upper edge of the lower screen section. Suitable couplings are activated to releasably couple the screen sections together. Next, the telescoping support is lifted to lift the two screen sections as integrated together into a single display up to a desired elevation. In the embodiment in which three screen sections are employed, once the top and middle sections are coupled together as explained above, the two coupled sections are lifted until the lower edge of the middle section is above the upper edge of the lowermost section. Then, the spreader bar is reciprocated an additional amount to align those respective edges, whereupon the mast is lowered to couple those edges together, whereupon the completely integrated three section display screen may be elevated to a desired elevation.

(7) The telescoping support is mounted on a rotary support that allows the rotative position of the display screen to be incrementally adjusted. In the preferred embodiment, a motor is coupled to the rotary adjustment means by a gear drive. Incremental movements of the gears allow adjustment of the rotative orientation of the telescoping support with a great degree of precision.

Accordingly, it is a first object of the present invention to provide a trailer with display screen storage and support.

It is a further object of the present invention to provide such an invention in which a telescoping support has mounted thereto a portion of the roof of the trailer as well as the upper section of a display screen.

It is a still further object of the present invention to provide such an invention in which a lower section of a display screen may be releasably coupled to an upper section thereof.

It is a still further object of the present invention to provide such an invention in which a lower section of the display screen is releasably mountable on a spreader bar that may be reciprocated along the trailer bed from a stored position to a position of alignment under an upper display screen section.

It is a yet further object of the present invention to provide such a device in which the screen display is made up of three separable sections which include side portions that are pivotable to enlarge the size of the assembled display.

It is a still further object of the present invention to provide such a telescoping support mounted on rotary adjustment means allowing the rotative position of the support and thereby of the display screen to be incrementally adjusted.

These and other objects, aspects and features of the present invention will be better understood from the following detailed description of the preferred embodiment when read in conjunction with the appended drawing figures.

BRIEF DESCRIPTION OF THE DRAWINGS

FIG. 10 shows a side view of a male t-bolt assembly forming a part of the coupling means between the spreader bar and the lower half of the display screen as well as the coupling means coupling the screen halves together.

FIG. 11 shows a top view of the male t-bolt assembly of FIG. 10.

FIG. 12 shows a top view of the female receptacle portion of the coupling means.

FIG. 13 shows a side view of the male t-bolt assembly rotated 90 degrees to a locked position.

FIG. 14 shows a top view of the structure of FIG. 13.

FIG. 15 shows a side schematic representation of the spreader bar, coupling means, and lower portions of the lower display half.

FIG. 28 shows a top view of an embodiment of the inventive spreader bar provided with two rows of coupling members for the display embodiment made up of three separable sections.

FIG. 29 shows a side view of the spreader bar of FIG. 28.

FIG. 35 shows an exploded perspective view of the motor-gear drive.

SPECIFIC DESCRIPTION OF THE PREFERRED EMBODIMENT

Figure 1:
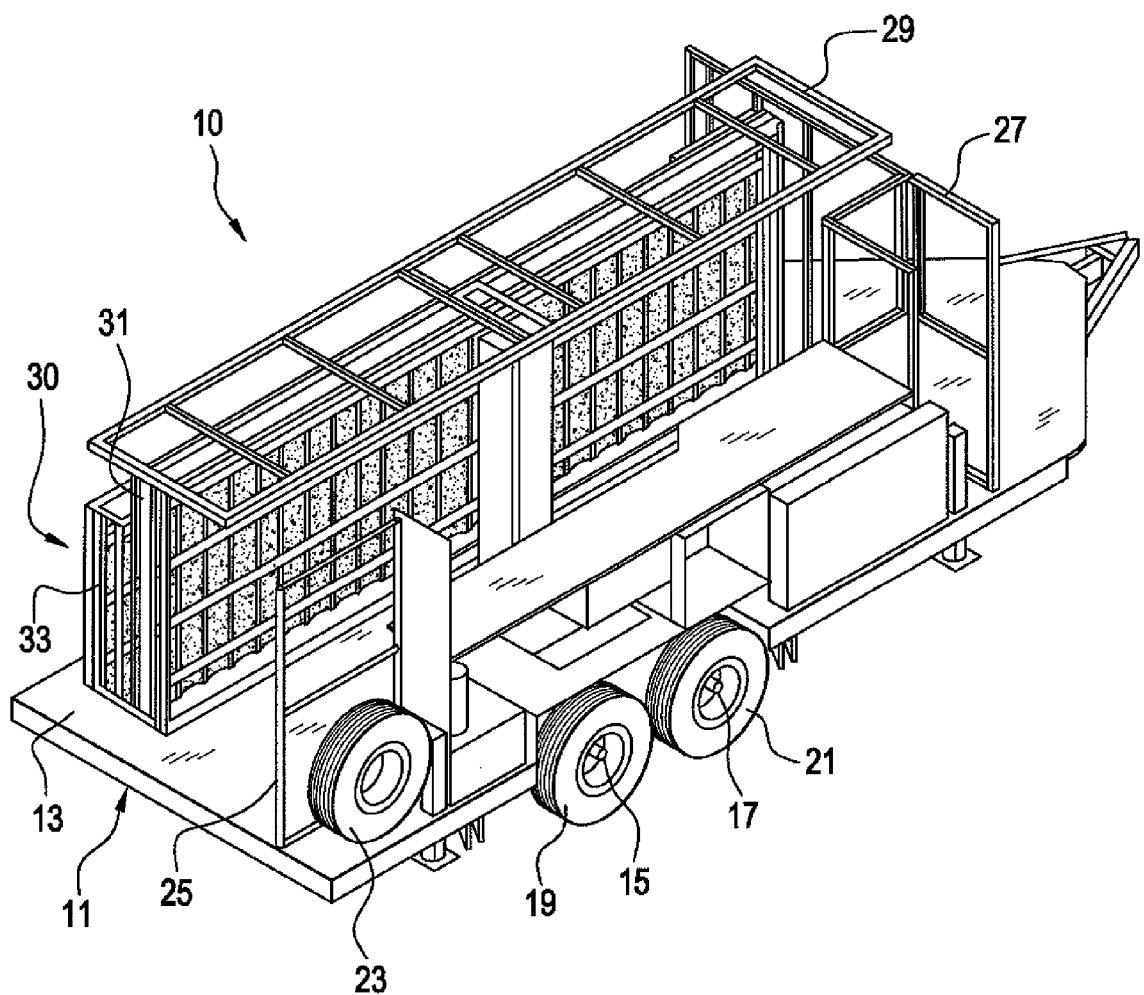
FIG. 1 shows a perspective view of the inventive trailer with portions removed to show detail.

With reference, first, to FIG. 1, the inventive trailer is generally designated by the reference numeral 10, and is seen to include a bed or platform 11 having a top surface 13. In the example shown, the trailer includes axles 15 and 17 to which are respectively affixed tires 19 and 21, with corresponding tires on the side not shown in FIG. 1. A spare tire 23 is also provided. The walls of the trailer 10 have been removed in FIG. 1 to show detail, although framing 25 and 27 is shown to schematically represent some of the walls. A roof sub-section 29 is also shown and is affixed to the telescoping support as will be described in greater detail hereinafter.

With further reference to FIG. 1, a first embodiment of a display screen is generally designated by the reference numeral 30 and includes an upper half or sub-module 31 and a lower half or sub-module 33. As will be described in greater detail hereinafter, the upper screen half 31 is connected to the telescoping support and releasably attachable to the lower screen half along a generally horizontal interface.

Figure 2:
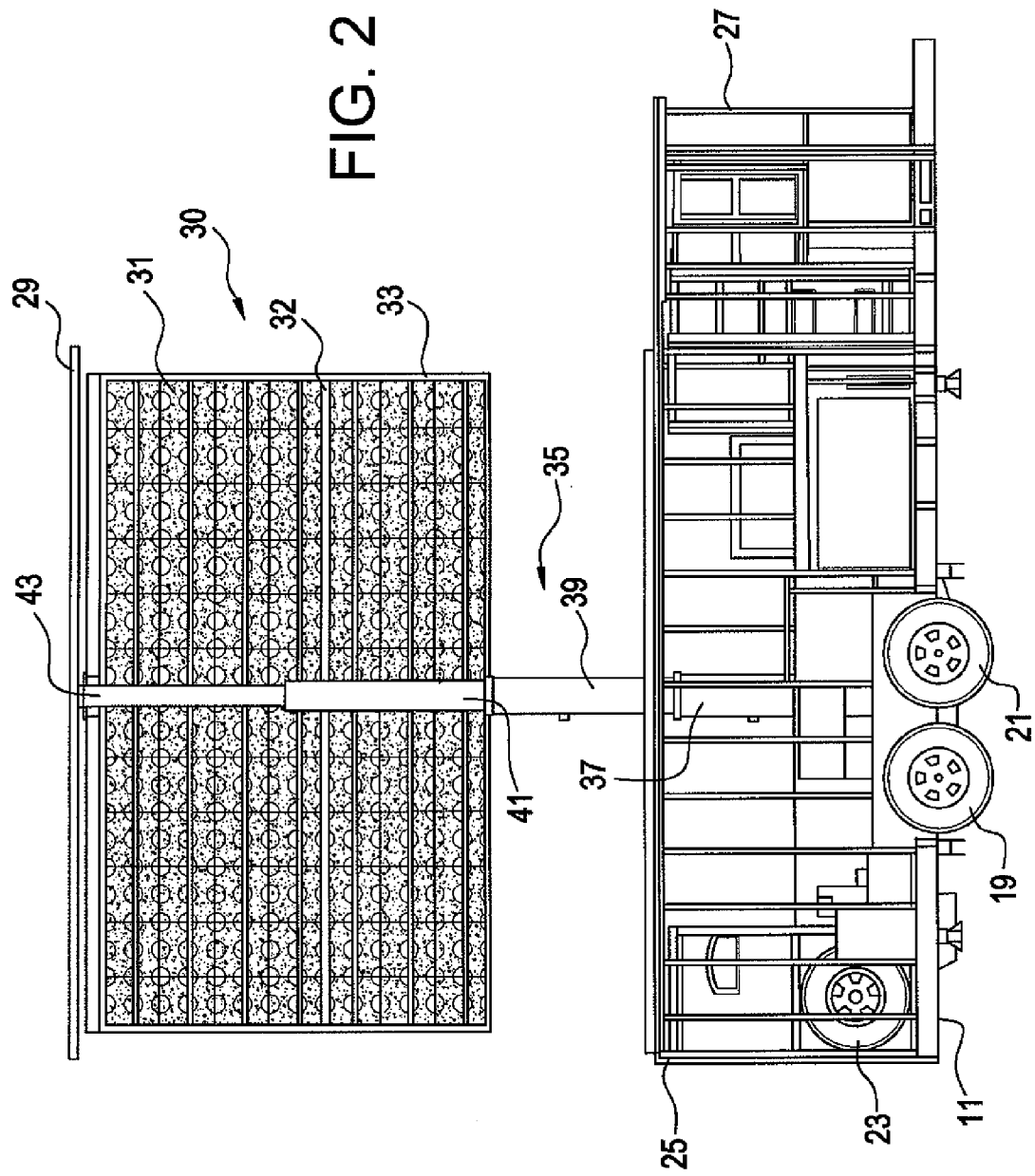
FIG. 2 shows a side view of the inventive trailer with the display screen integrated and elevated and with parts removed to show detail.
Figure 3:
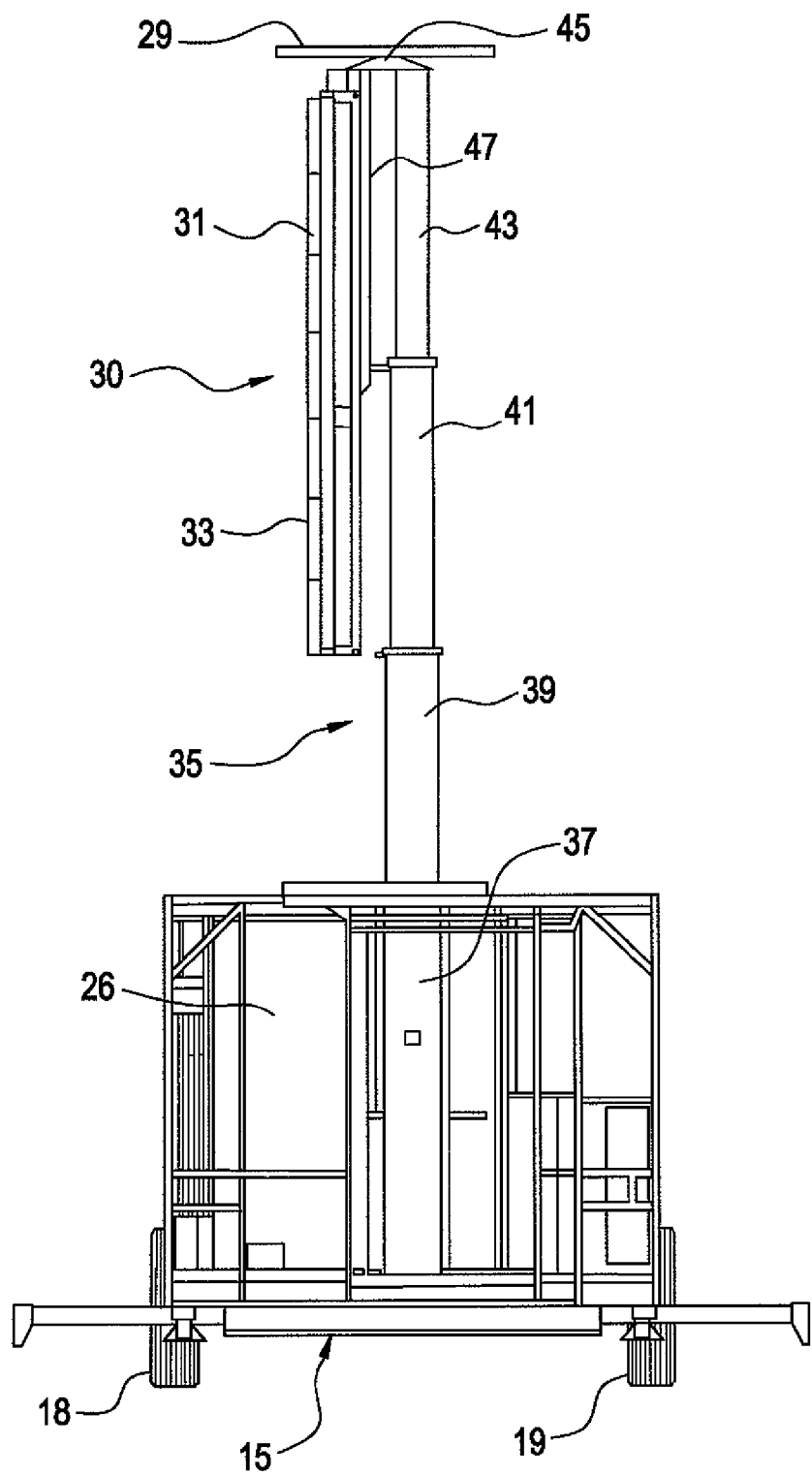
FIG. 3 shows an end view of the inventive trailer in the configuration shown in FIG. 2.
Figure 4:
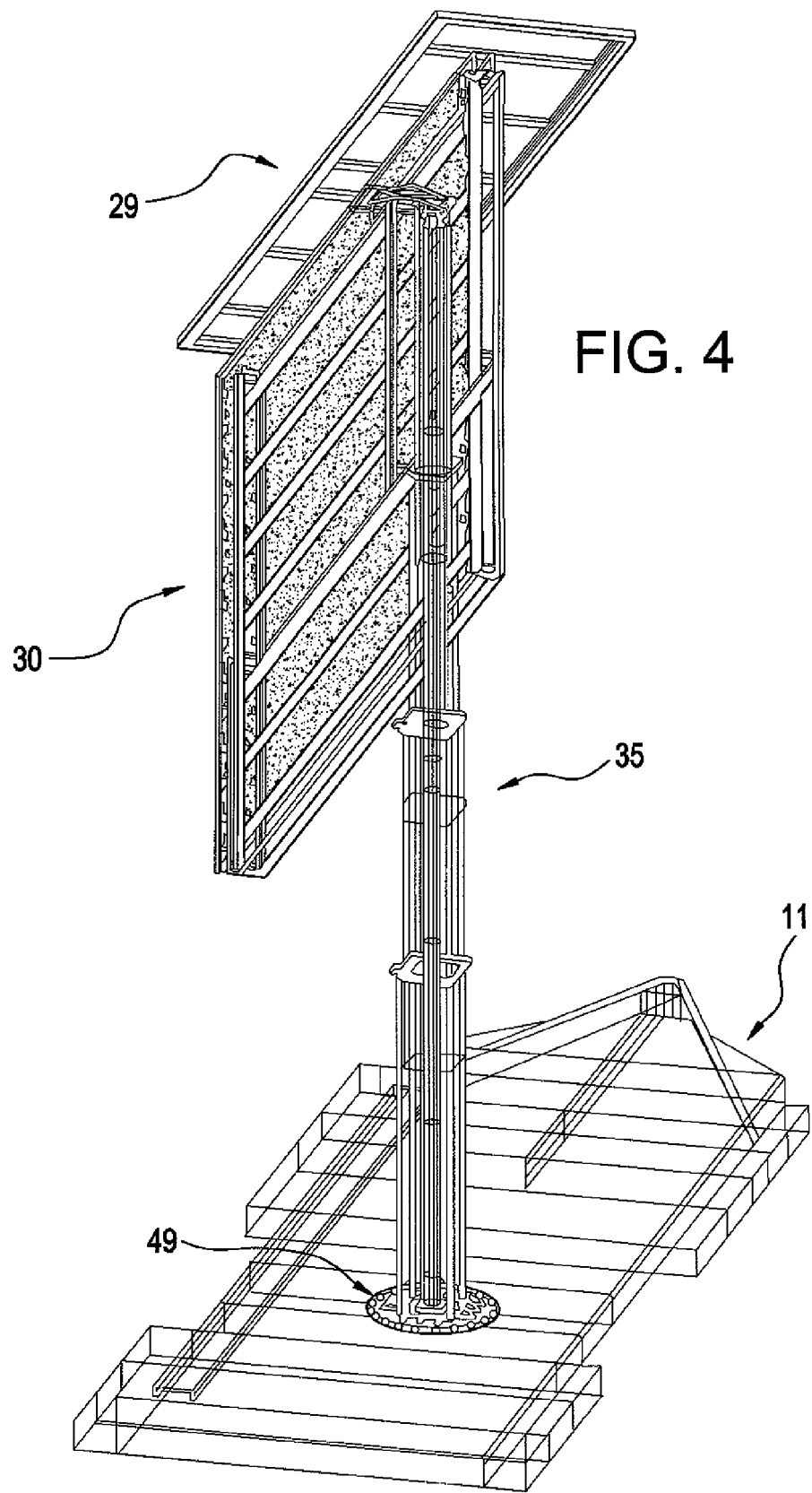
FIG. 4 shows a rear perspective view of the telescoping support integrated display screen and trailer roof portion with the telescoping support extended.

FIGS. 2-4 show more details of the features shown in FIG. 1. Thus, in FIGS. 2-4, the display screen 30 is shown with the upper half 31 and lower half 33 interconnected together at the interface 32. The telescoping support 35 includes sections 37, 39, 41 and 43, with the section 43 coupled to the roof section 29 as clearly seen in FIG. 2. As seen in FIG. 3, the roof section 29 is attached to the telescoping section 43 by virtue of a bracket 45 which also has a downwardly extending section 47 that assists in coupling to the upper half 31 of the display screen 30. FIG. 3 also shows the tire 18 on the opposite end of the axle 15 that supports the tire 19. FIG. 2 also shows the framing 25 which in the finished trailer is covered with sheathing to create an enclosure. Some of the sheathing is shown in FIG. 3 designated by the reference numeral 26. FIG. 4 shows the circular base support for the telescoping support 35. As will be explained in greater detail hereinafter, the base support 49 supports the telescoping support 35 for rotative movements in one direction or the other through activations of a motor (not shown in FIG. 4).

Figure 24:
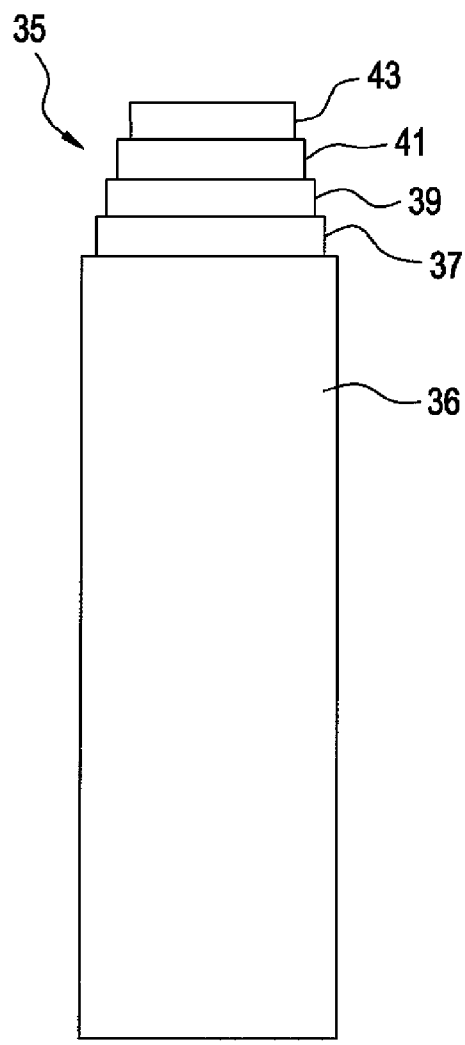
FIG. 24 shows a side view of a telescoping mast including, for example, five telescoping sections.

With reference now to FIGS. 24-27, further details of the telescoping support 35 will be explained. In, for example, FIGS. 2-4, the telescoping support 35 is shown including four sections 37, 39, 41 and 43. With reference to FIG. 24, a fifth section 36 may also be provided. In fact, any number of telescoping sections may be provided for the support 35 depending upon the desired elevation of the screen display 30 above the trailer 10. Of course, one limitation is the fact that all sections of the support 35 that will elevate through the opening in the roof of the trailer closed by the roof section 29 must have dimensions permitting it to traverse that opening. Additionally, there is an inherent limitation on the potential elevation of the display screen 30 concerning its size and weight with respect to the weight of the trailer and the lever arm when taking into account the area of the display screen 30 and the force that might be generated by wind. In other words, wind forces striking the display screen 30 create a lateral force that could conceivably cause the trailer to tip over. The higher the display screen is elevated, the greater the effect of such wind force.

Figure 25:
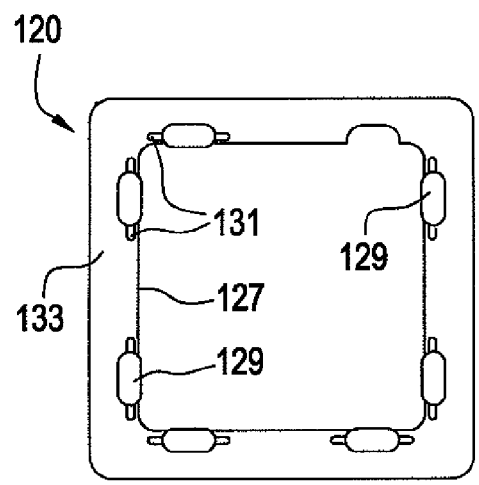
FIG. 25 shows a top view of a collar incorporated into the telescoping mast to facilitate telescoping functions of the mast.
Figure 26:
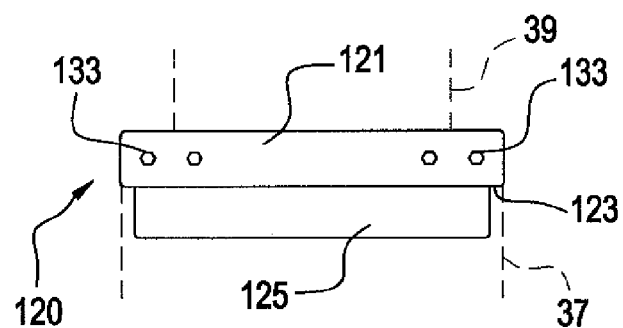
FIG. 26 shows a side view of the collar of FIG. 25, with two mast sections associated therewith shown in phantom.
Figure 27:
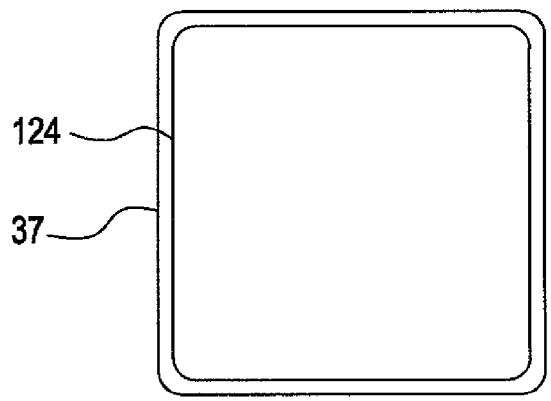
FIG. 27 shows a top view of a typical mast section.

The effect of such wind forces and other imbalances in the display screen 30 with respect to the telescoping support 35 can cause the telescoping sections of the support to bind with respect to one another, thereby rendering it difficult to raise or lower the respective telescoping sections. For this purpose, with particular reference to FIGS. 25-27, a collar 120 is employed at the interface between adjacent telescoping sections. With particular reference to FIGS. 25 and 26, the collar 120 includes a larger upper section 121 having a downwardly facing shoulder 123 that sits on the top edge, for example, 124 (FIG. 27), of the upper termination of a telescoping section such as the section 37 shown in phantom in FIG. 26 and in solid lines in FIG. 27. The collar 120 includes a lower section 125 that extends slightly into the telescoping section, for example, 37. The sections 121 and 125 have a common passageway 127 (FIG. 25) that supports the next section above, for example, the section 39 shown in phantom in FIG. 26.

With particular reference to FIG. 25, the collar 120 includes a plurality of rollers 129 supported on shafts 131, the lateral position of which may be adjusted. For this purpose, the shafts 131 may be moved toward or away from the opening 127 through the operation of set screws 133 of which one is shown in FIG. 25. In this way, the rollers 129 may be adjusted so that they engage the side walls of a telescoping section such as the section 39 shown in phantom in FIG. 26, so that the only surface of engagement between the sections 37 and 39 is the outer surfaces of the rollers 129. This surface area reduction significantly reduces frictional forces and facilitates guidance of adjacent telescoping sections. Even though imbalance of the screen display 30 with respect to the support 35 and forces imposed on the screen display 30 such as by the wind would otherwise cause adjacent telescoping sections to bind, the arrangement of the collars 120 and rollers 129 precludes such effects.

Figure 5:
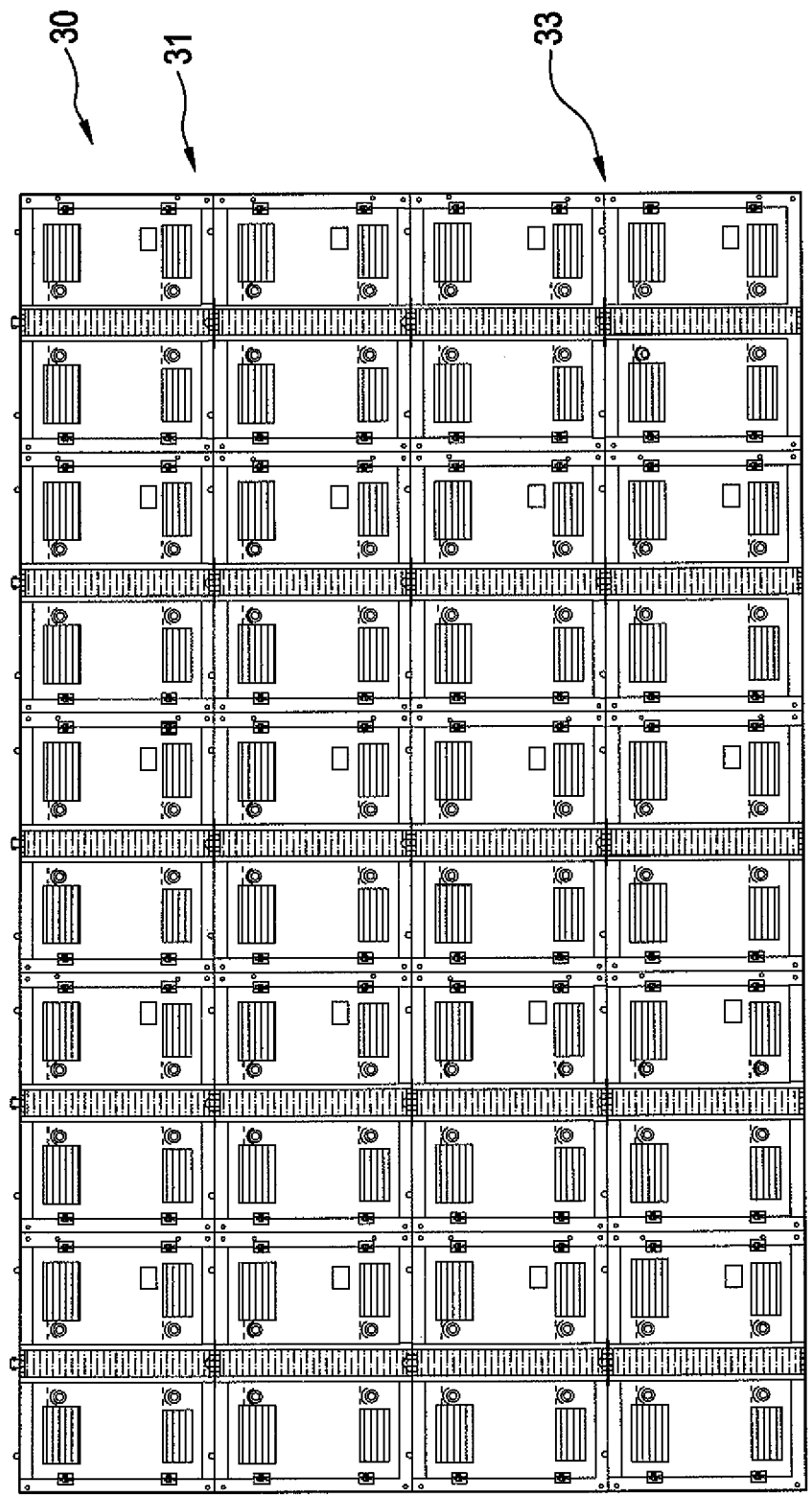
FIG. 5 shows a front view of an example of a multi panel display screen in accordance with the teachings of the present invention.

With reference to FIG. 5, the first display embodiment 30 is seen in more detail with its upper half 31 coupled with its lower half 33. The display screen 30 is seen to include a multiplicity of panels identified by the reference numeral 34 which are electrically coupled together in a manner well known to those of ordinary skill in the art so that all of the panels combine together to be able to show a single program that is displayed on the entirety of the display screen 30 made up of a multiplicity of individual panels 34 coupled together. Of course, the entire display area can be divided up to show multiple programs simultaneously as desired.

Figure 6:
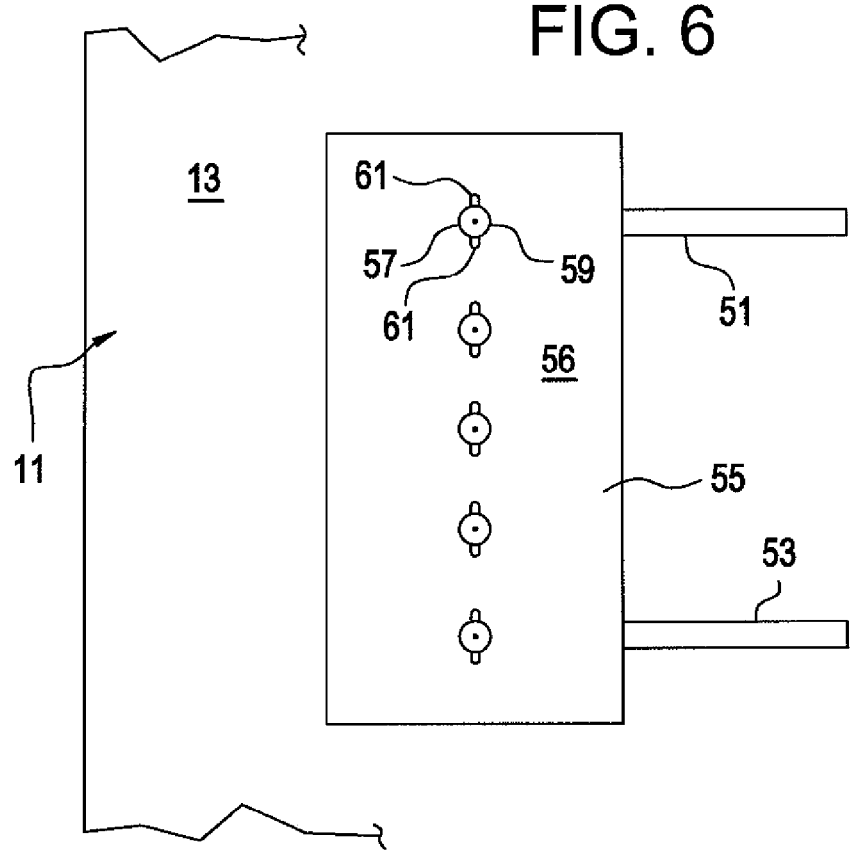
FIG. 6 shows a top view of a portion of the trailer showing the spreader bar and coupling means.

Reference is now made to FIGS. 6-15 in which a description of the manner of assembly of the screen halves 31 and 33 of the first screen embodiment is explained in more detail along with the manner of movement of the lower screen half 33 to a position at which it may be coupled with the upper screen half 31. With reference, first, to FIG. 6, it is seen that the platform or bed 11 of the trailer 10 has a top surface 13. Two slots 51 and 53 are formed completely through the bed 11 for a purpose to be described in greater detail below. A spreader bar 55 includes a plurality of male coupling halves 57 mounted on its upper surface 56. Each male coupling half 57 includes a post 59 and opposed ears 61 as more particularly shown in FIGS. 10-11 and 13-14. With reference to FIG. 12, a female coupling half 63 includes an opening 65 having a central portion 67 sized to receive the post 59 of the male coupling half 57, and two ear-like recesses 69, each sized to receive one of the ears 61. As should be understood, to couple together the coupling halves 57 and 63, the post 59 is inserted into the recess 67, whereupon the post 59 is rotated 90 degrees to mis-align the ears 61 with respect to the recesses 69 to lock the coupling halves together. As should be understood, with reference back to FIG. 6, the posts 59 are rotatably mounted on the spreader bar 55 in a manner well known to those of ordinary skill in the art.

Figure 7:
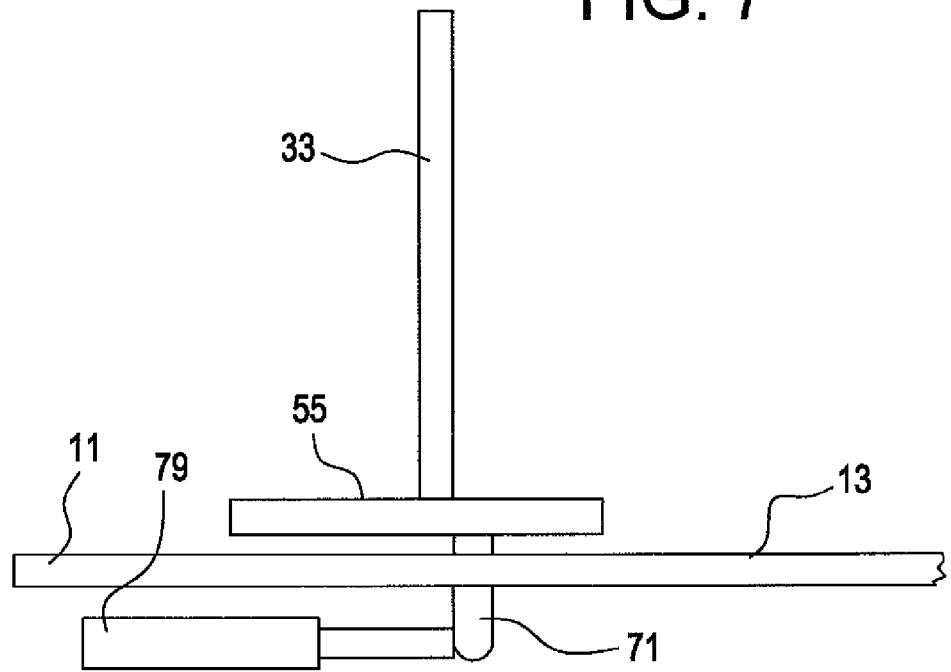
FIG. 7 shows a side view of the structure shown in FIG. 6, with the lower screen half coupled to the spreader bar and details of the activation cylinders shown.
Figure 8:
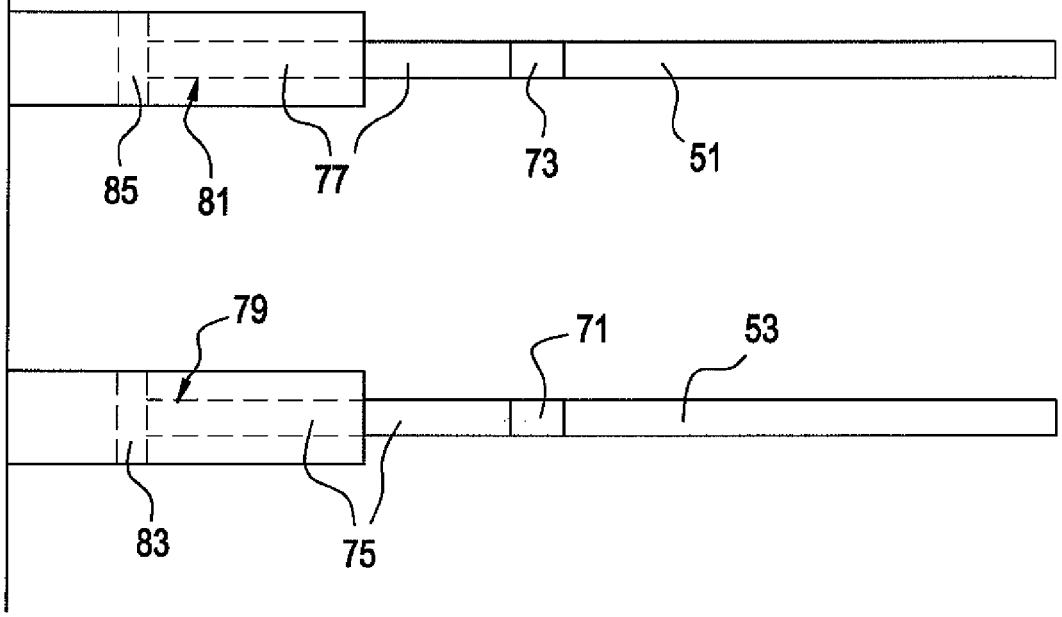
FIG. 8 shows a bottom view of a portion of the trailer showing the cylinders, links, and slots.

With reference now to FIGS. 7 and 8, it is seen that the spreader bar 55 has a link 71 depending downwardly therefrom which extends through one of the slots 51, 53. FIG. 7 shows one such link 71 and FIG. 8 shows the other link 73.

With reference to FIGS. 7 and 8, the links 71 and 73 are respectively connected to a ram device comprising piston rods 75 and 77 that extend within the respective cylinders 79 and 81 and are coupled to pistons 83 and 85 shown in phantom in FIG. 8.

With reference to FIG. 15, an end view of the spreader bar 55 is shown which clearly shows the posts 59 extending upwardly therefrom. Also shown in FIG. 15 is the lower termination of the lower screen half 33 showing the female receptacles 63 aligned over the posts 59, but with the posts 59 and receptacles 63 uncoupled. As explained earlier, in order to couple the posts 59 to the receptacles 63, the lower screen half 33 is lowered from the view of FIG. 15 and once the ears 61 enter the recesses 69, the posts 59 are rotated 90 degrees with the ears in a space above the recesses 69 by any desired means to lock the posts 59 into the receptacles 63.

Figure 9:
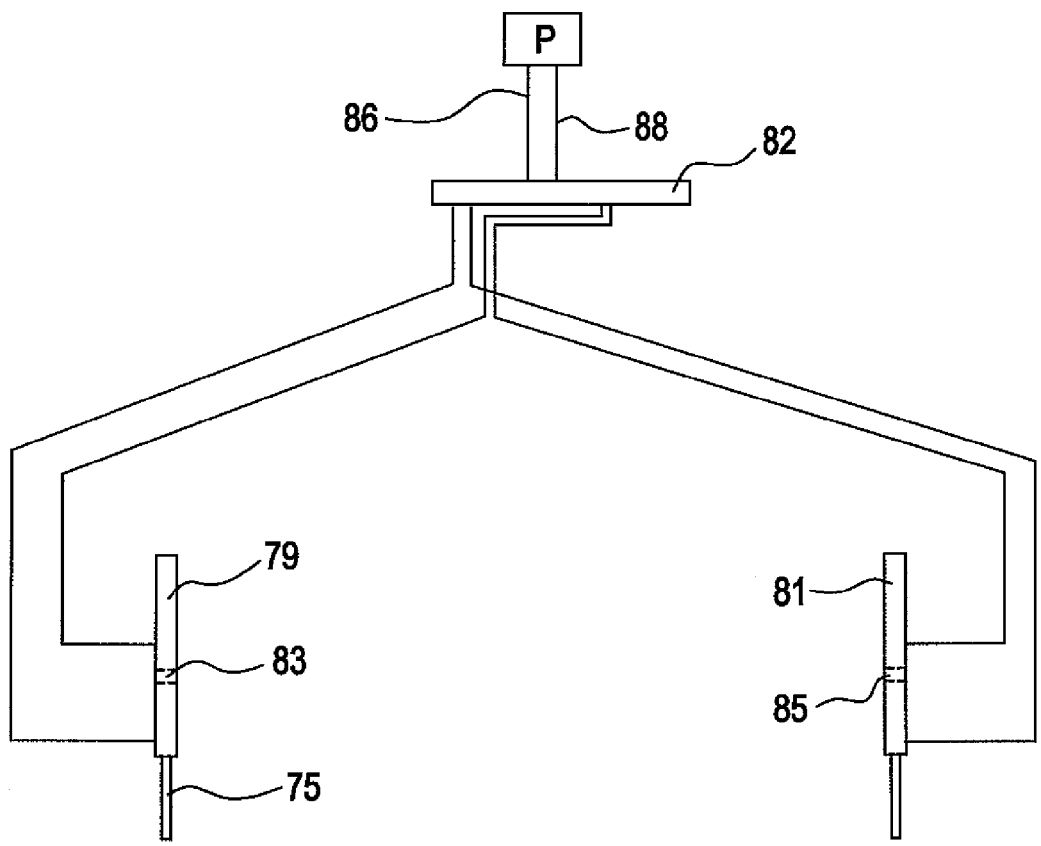
FIG. 9 shows a schematic representation of the manner of actuation of the spreader bar cylinders.
Figure 16:
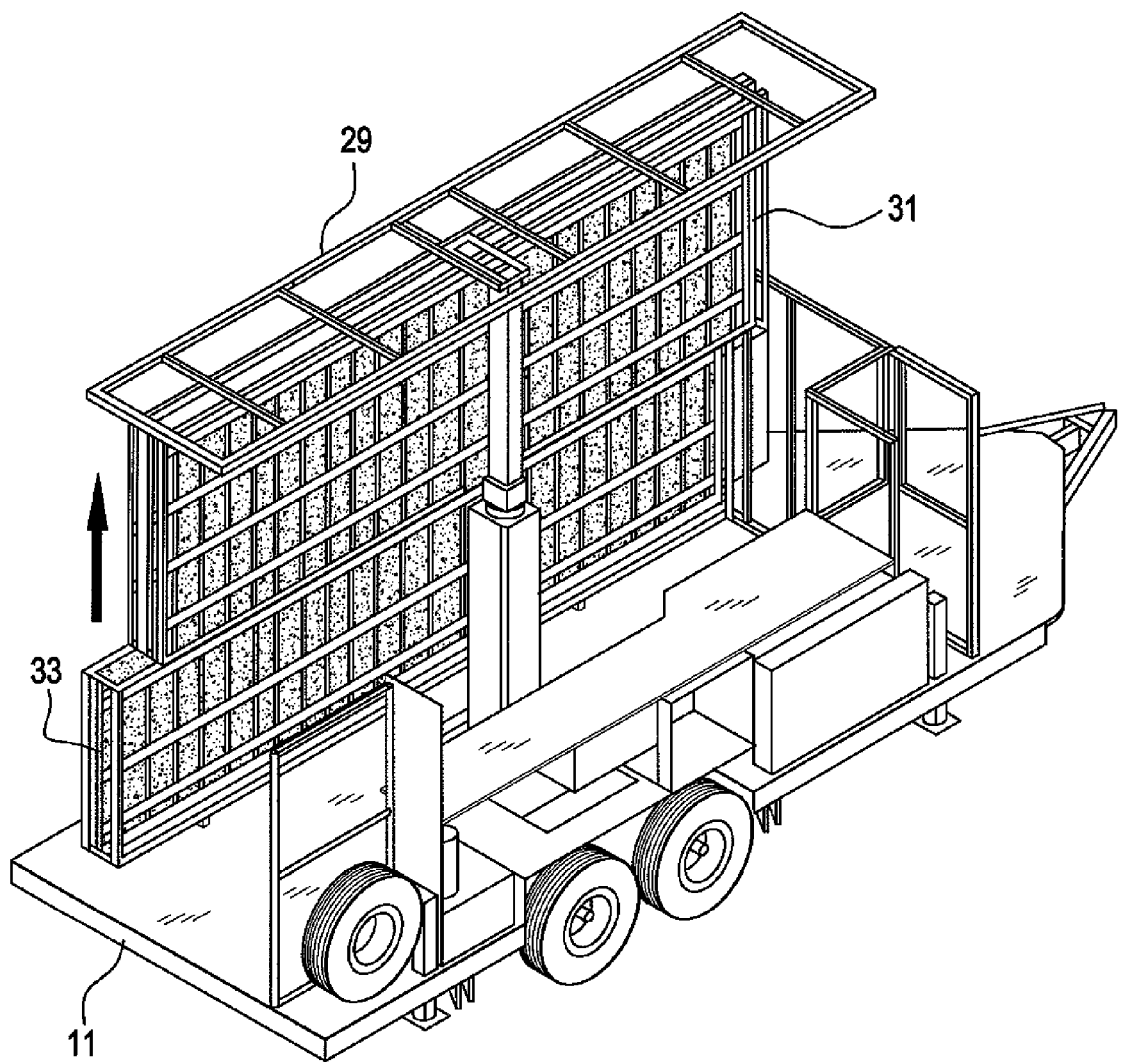
FIGS. 16-19 show the sequence of coupling the screen halves together and elevating them using the telescoping support.
Figure 17:
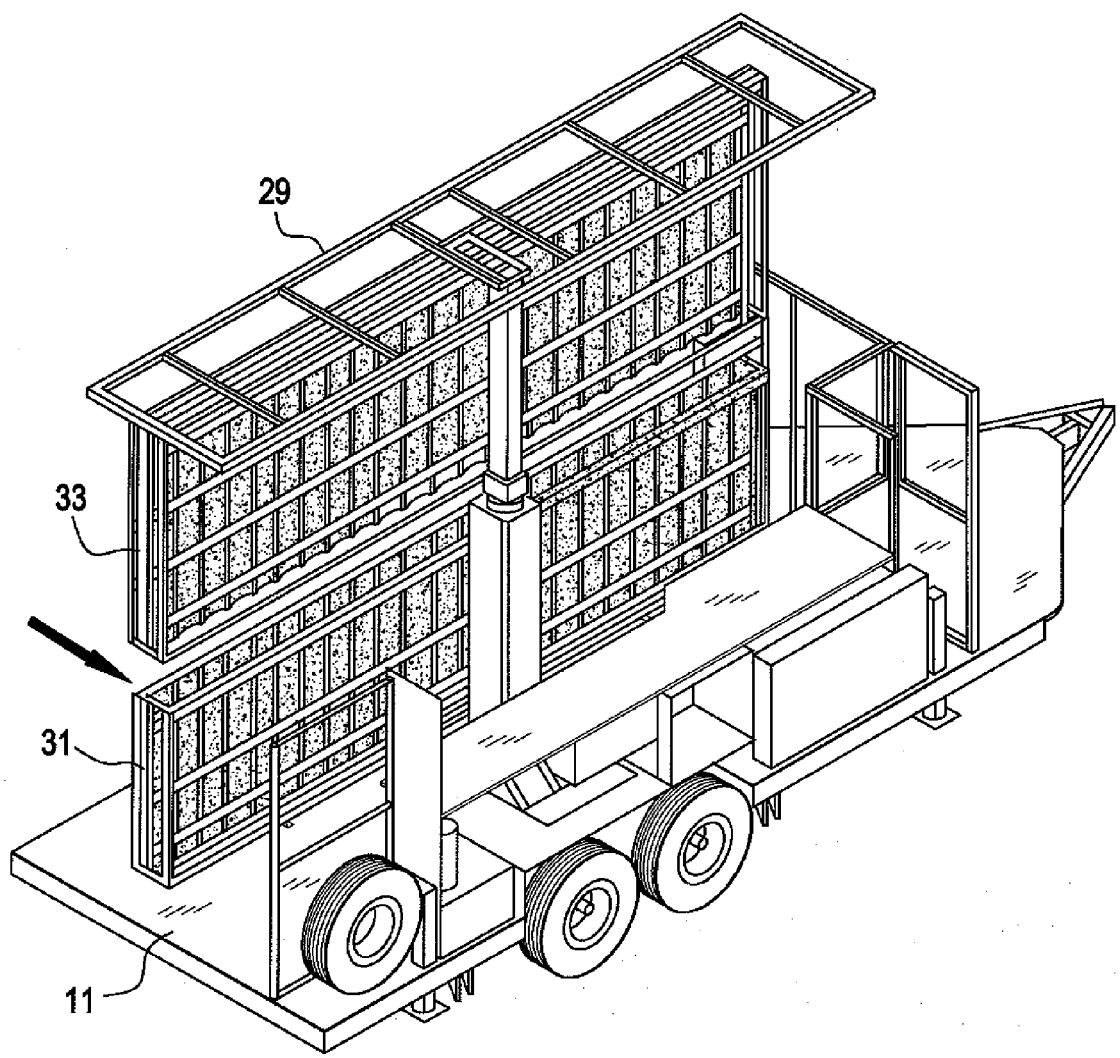
Figure 18:
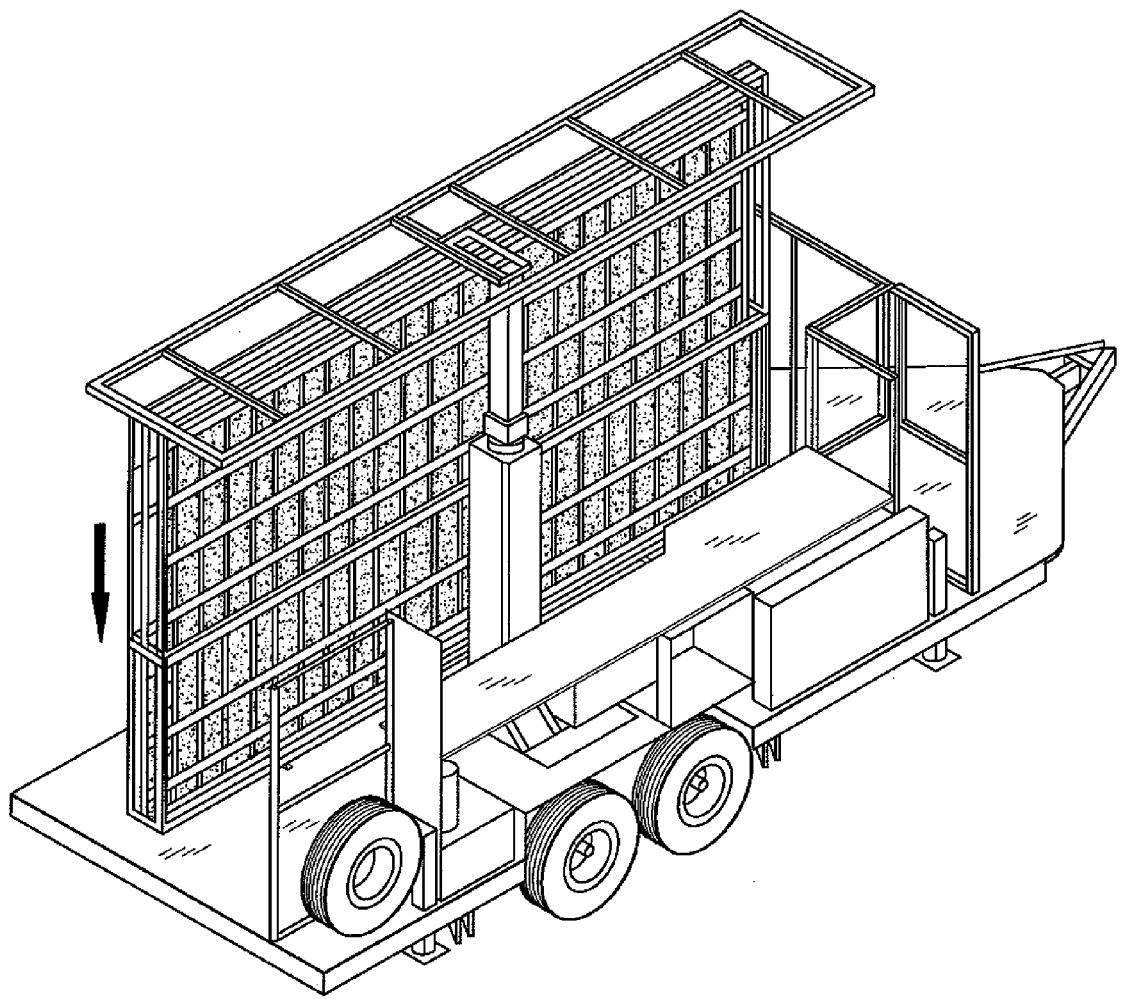
Figure 19:
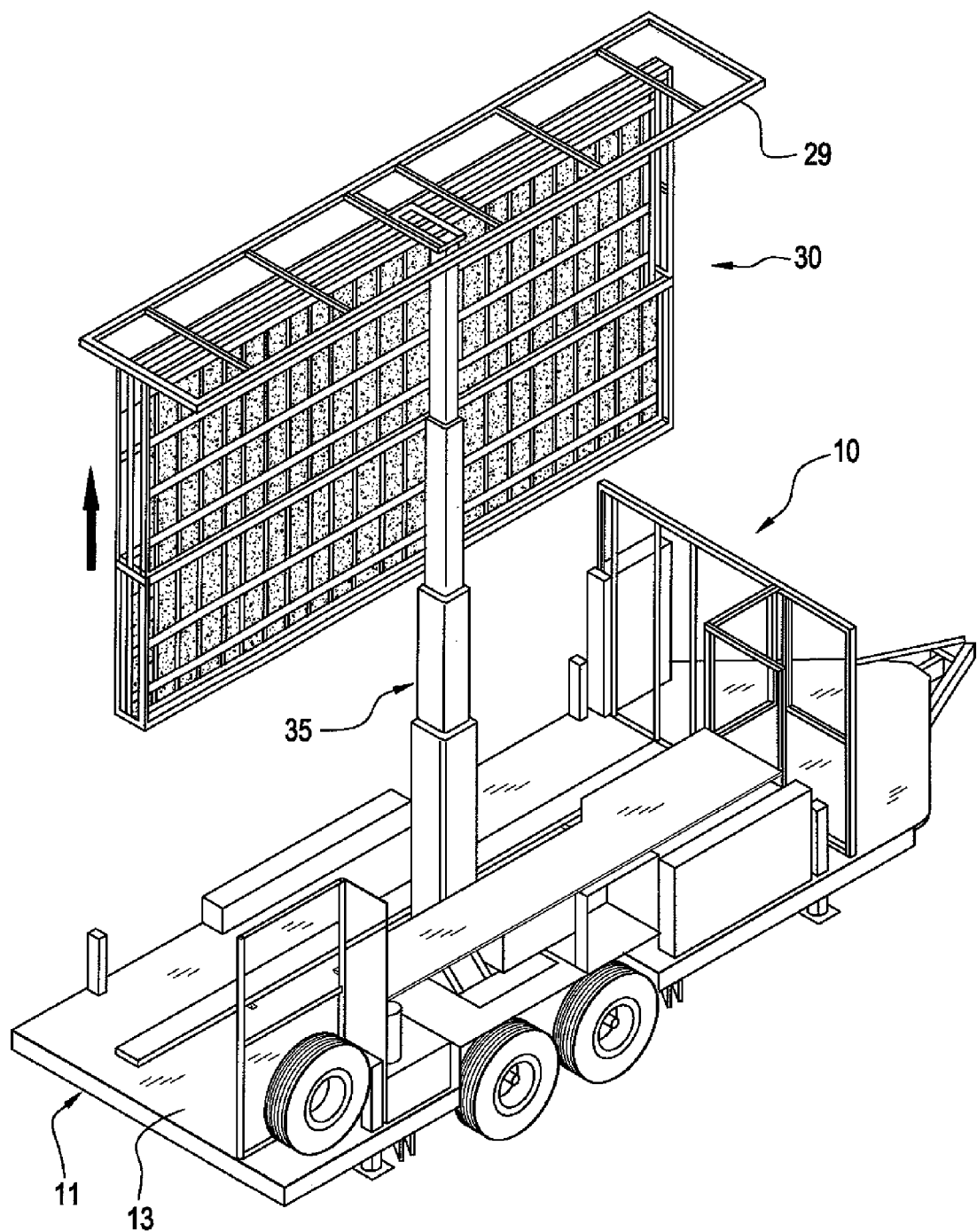

With reference to FIG. 9, the hydraulic circuit for operation of the cylinders 79 and 81 is shown. As shown, a four port reversing valve 82 is provided and each cylinder 79, 81 has two hydraulic lines connected at opposite sides of the pistons received therein as shown in phantom in FIG. 9. The valve 82 receives pressurized fluid from lines 86 and 88 that extend from the pump P. As should be understood by those of ordinary skill in the art, when it is desired to extend the piston rods 75 and 77 in the downward direction in the view of FIG. 9, the valve 82 is moved to a first position so that hydraulic fluid pumped through the lines 86, 88 by the pump P will arrive above the pistons 83 and 85 in the view of FIG. 9 to move the pistons 83 and 85 downward in the view of FIG. 9 to extend the piston rods 75 and 77. When it is desired to retract the piston rods 75 and 77, the valve 82 is moved to its second position so that hydraulic fluid pumped through the lines 86 and 88 is then directed to the hydraulic lines below the pistons 83 and 85 in the view of FIG. 9 to cause the pistons 83 and 85 to move upward in the view of FIG. 9 to retract the piston rods 75 and 77 in the upward direction of FIG. 9.

Comparing FIG. 9 and FIG. 8, the direction of retraction of the piston rods 75 and 77 is in the left-hand direction in the view of FIG. 8, while extension of the piston rods 75 and 77 is in the right-hand direction in the view of FIG. 8.

Figure 30:
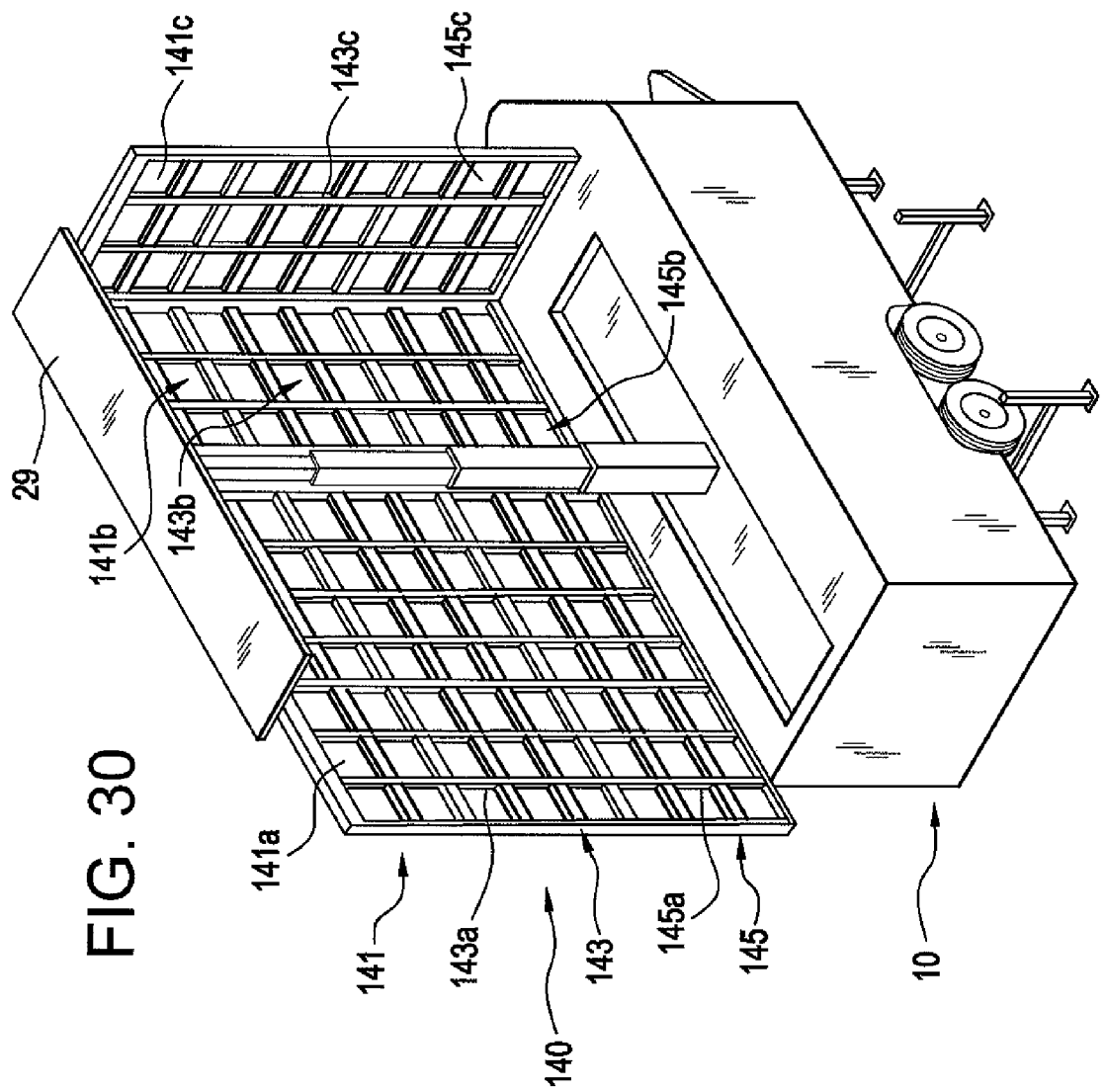
FIG. 30 shows a perspective view of the inventive trailer with the embodiment of display screen including three horizontally divided sections with pivotable side portions.

Reference is now made to FIGS. 28-30 for a description of a second embodiment of display screen and a second embodiment of spreader bar. With reference first to FIG. 30, a second embodiment of display screen is generally designated by the reference numeral 140. The display screen 140 includes three horizontally divided sections including the upper section 141, a middle section 143, and a lower section 145. The upper section 141 is attached to the roof section 29 in the same manner as is the case with respect to the upper screen half 31 in the screen embodiment best seen in FIGS. 2-5.

With further reference to FIG. 30, the upper screen section 141 includes three sub-sections, designated by the reference numerals 141*a*, 141*b*, and 141*c*. Similarly, the middle screen section includes three sub-sections designated by the reference numerals 143*a*, 143*b*, and 143*c*. Similarly, the lower screen section 145 includes three sub-sections designated by the reference numerals 145*a*, 145*b*, and 145*c*. As should be understood from FIG. 30, the combined sub-sections of the three screen sections designated by the reference letter suffixes "a" and "c" comprising wing sub-sections "a" and "c" are each pivotable together with respect to each opposed end of the center sub-section designated with the suffix "b." Thus, the width of the center sub-section "b" must be slightly shorter than the length of the roof section 29. The wing sub-sections "a" and "c" may be pivoted to lie against the sub-sections "a" in a stored position and may be extended out as shown in the left-hand side of FIG. 30 to create a screen with a length perhaps exceeding the length of the trailer 10.

In the preferred embodiment of the screen display 140, the wing sub-sections "a" and "c" are always electrically connected to the center sub-section "b" regardless of their pivoted position. The pivoting of the wing sub-sections "a" and "c" with respect to the center sub-section "b" may be accomplished manually or through use of a mechanical actuator (FIGS. 31-35) and suitable locking means are provided to retain the wing sub-sections "a" and "c" in either the folded position for storage or the extended position for use as part of a large display 140.

Figure 31:
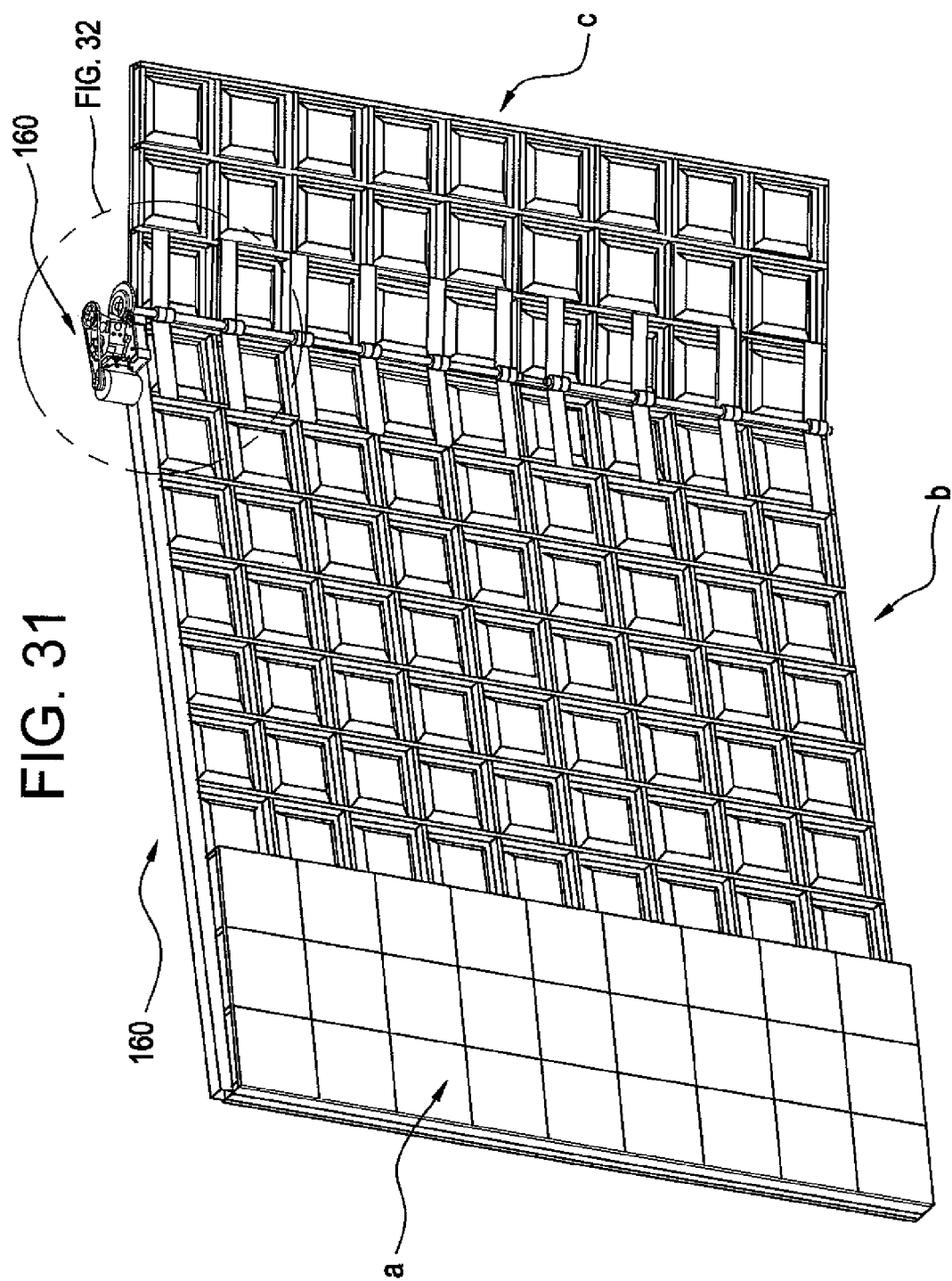
FIG. 31 shows a front perspective view of the second embodiment of the present invention showing the motor-gear drive mounted thereon.
Figure 32:
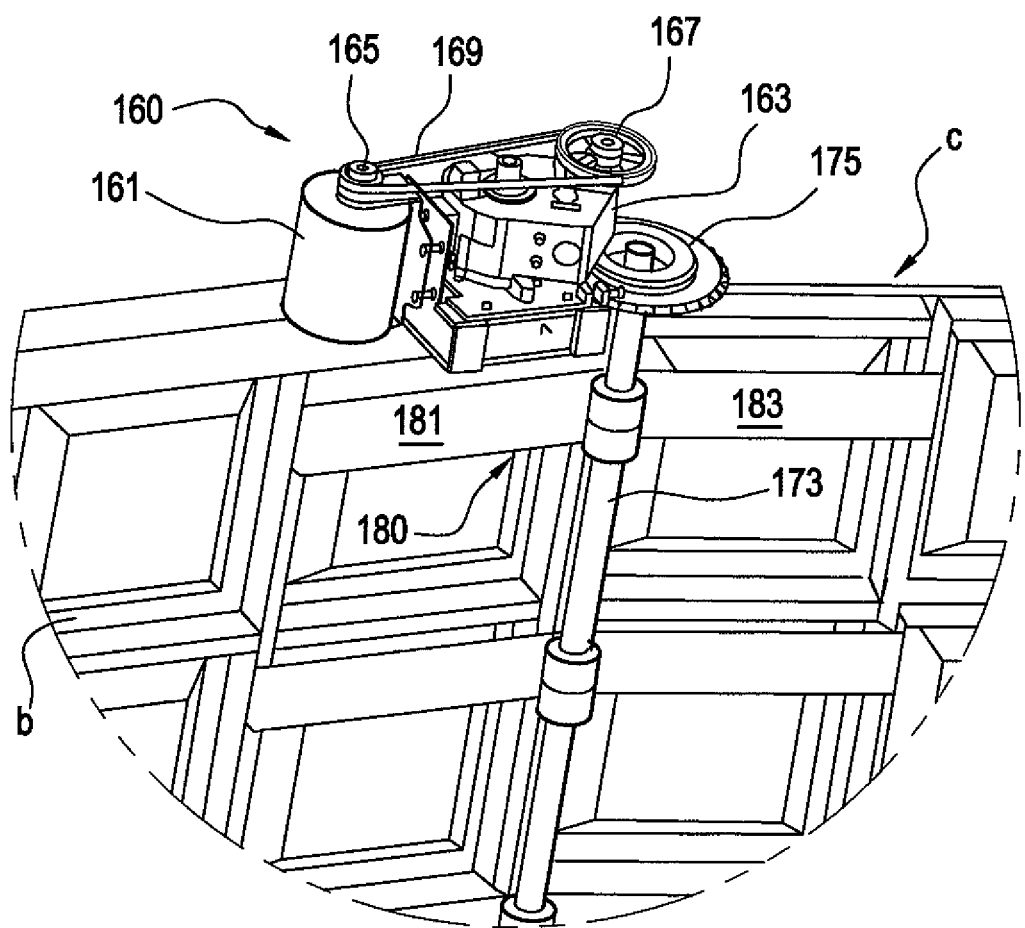
FIG. 32 shows a close-up perspective view of the motor-gear drive as mounted on the panels.

With reference now to FIGS. 31-38, an explanation will be given of the manner of folding and unfolding of the wing sub-sections "a" and "c" with respect to the center sub-section "b." As broadly shown in FIG. 30, the wing sub-sections "a" and "c" are pivotable with respect to the center sub-section "b." As shown in FIGS. 31-35, in particular, the pivoting of the sub-sections "a" and "c" with respect to the center sub-section "b" is accomplished by a motor-gear sub-system 160. With reference to FIGS. 31 and 32, the motor-gear sub-system includes a reversible electric motor 161, a gear housing 163, and a drive mechanism between the motor 161 and the gear housing 163 consisting of a pulley 165 attached to the shaft of the motor 161, a pulley 167 attached to the gear housing 163, and a belt 169 coupled between the pulleys 165 and 167.

Figure 33:
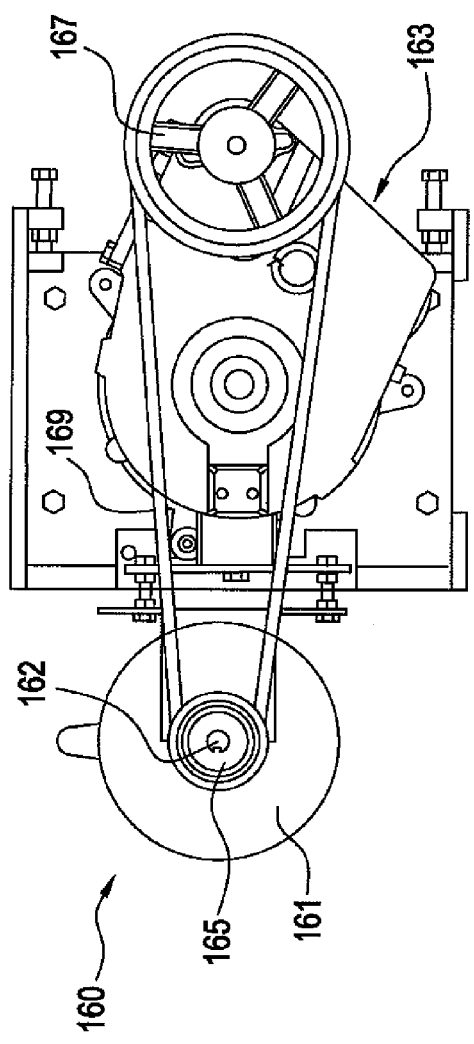
FIG. 33 shows a top view of the motor-gear drive.
Figure 34:
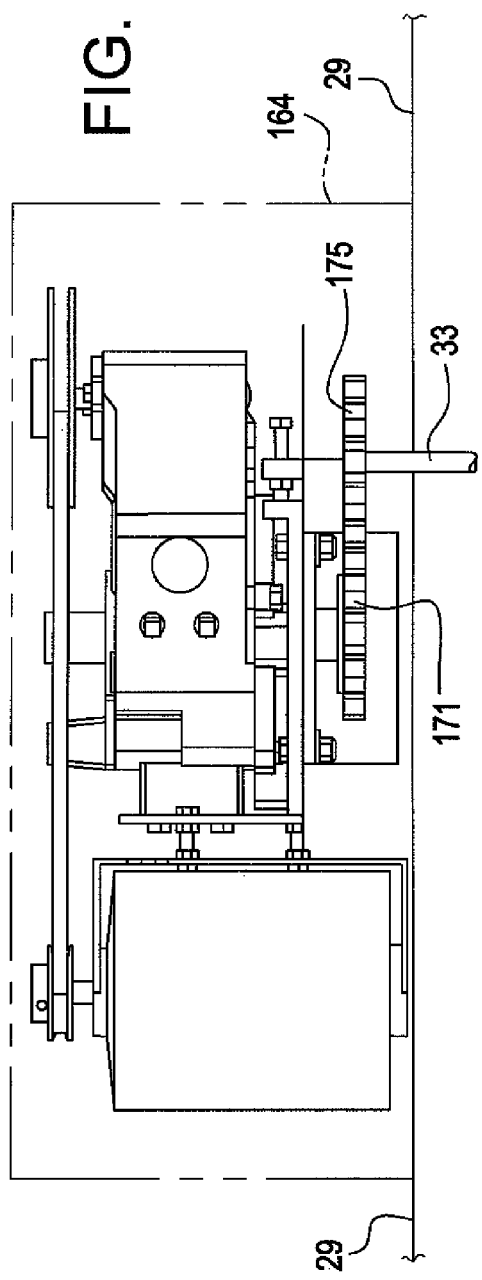
FIG. 34 shows a front view of the motor-gear drive.

With reference to FIGS. 33-35, the output shaft of the motor 161 is designated by the reference numeral 162 and is coupled to the pulley 165. The gear housing 163 includes internal gears (not shown) which convert the revolutions per minute of the motor 161 to slower revolutions of the output gear 171 (FIGS. 34 and 35).

The output gear 171 comprises a drive gear for rotating a wing sub-section ("a" or "c") with respect to the center sub-section "b." In the example shown in FIGS. 31-35, the wing sub-section "c" is the one shown. With reference to FIG. 32, a shaft 173 is coupled between the center sub-section "b" and the wing sub-section "c" by a hinge 180 described in greater detail hereinafter. The shaft 173 has fixedly mounted thereon a driven gear 175 that is enmeshed with the drive gear 171 as shown in FIG. 34. The ratio created between the drive gear 171 and the driven gear 175 is designed to facilitate the desired speed of pivoting of the wing sub-section "c" with respect to the center sub-section "b." The motor-gear sub-system 160 is mounted on top of the roof 29 in its own enclosure 164 (FIG. 34).

Figure 38:
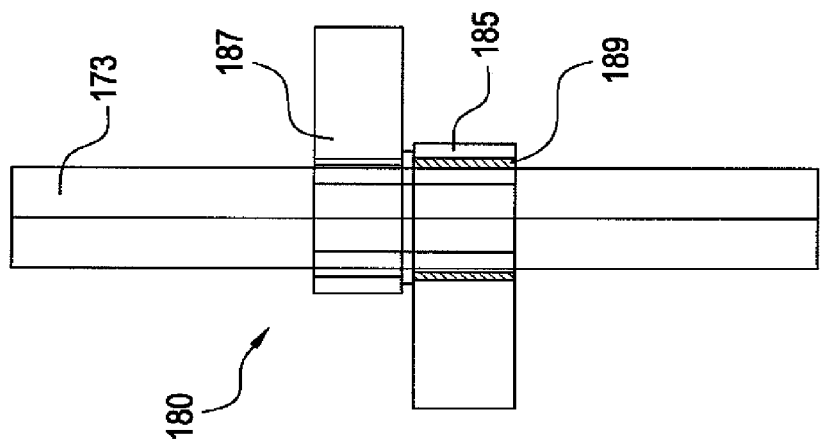
FIG. 38 shows a cross-sectional view of the hinge along the line 38-38 of FIG. 37.
Figure 36:
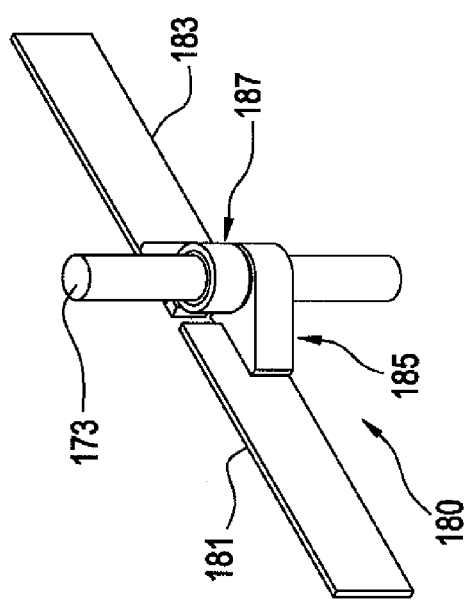
FIG. 36 shows a perspective view of the hinge coupling the center panel section to one of the wing sections.
Figure 37:
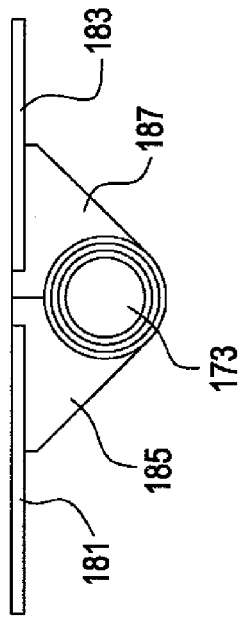
FIG. 37 shows a top view of the hinge.

With reference now to FIGS. 36-38, the hinge 180 includes a first plate 181 fixedly mounted to the center sub-section "b" (FIG. 32 as well) and a second plate 183 fixedly mounted to the wing sub-section "c" (FIG. 32). The plate 181 is fixed to a hinge member 185 while the plate 183 is fixedly mounted to a hinge member 187. As should be understood, the hinge member 187 is fixedly mounted to the shaft 173 and rotates therewith. By contrast, the hinge member 185 has an internal bearing that allows the shaft 173 to rotate with respect to the hinge member 185. This is seen with reference to FIG. 38.

Operation of the motor 161 includes its ability to reverse direction so that it can pivot the wing sub-section "c" with respect to the center sub-section "b" 180° from the position analogous to that of the wing sub-section "a" in FIG. 31 to the position of the wing sub-section "a" shown in FIG. 30.

As should be understood, the same operation of the motor-gear sub-system 160 shown in FIGS. 31-35 is also used to operate the wing sub-section "a" with respect to the center sub-section "b." In that case, the motor-gear sub-system is symmetrical as compared to the motor-gear sub-system 160 and is mounted in a similar location between the center sub-section "b" and the wing sub-section "a" to the same effect.

FIG. 31 shows the screen 140 with an elevation equal to display modules. In this configuration, the screen 140 may be horizontally split in two places (to create 3 equal height sub-modules) or in one place (to create a first sub-module 5 modules high and a second sub-module 4 modules high). In either case, the shafts 173 comprise multiple shaft sections that can couple together when assembled and de-couple for storage. In the preferred embodiment, there is only one horizontal split, and the trailer 10 is made tall enough to store 2 sub-modules side by side, as seen, for example, in FIG. 1. Storing 3 sub-modules side by side would require widening the trailer 10.

Figure 23:
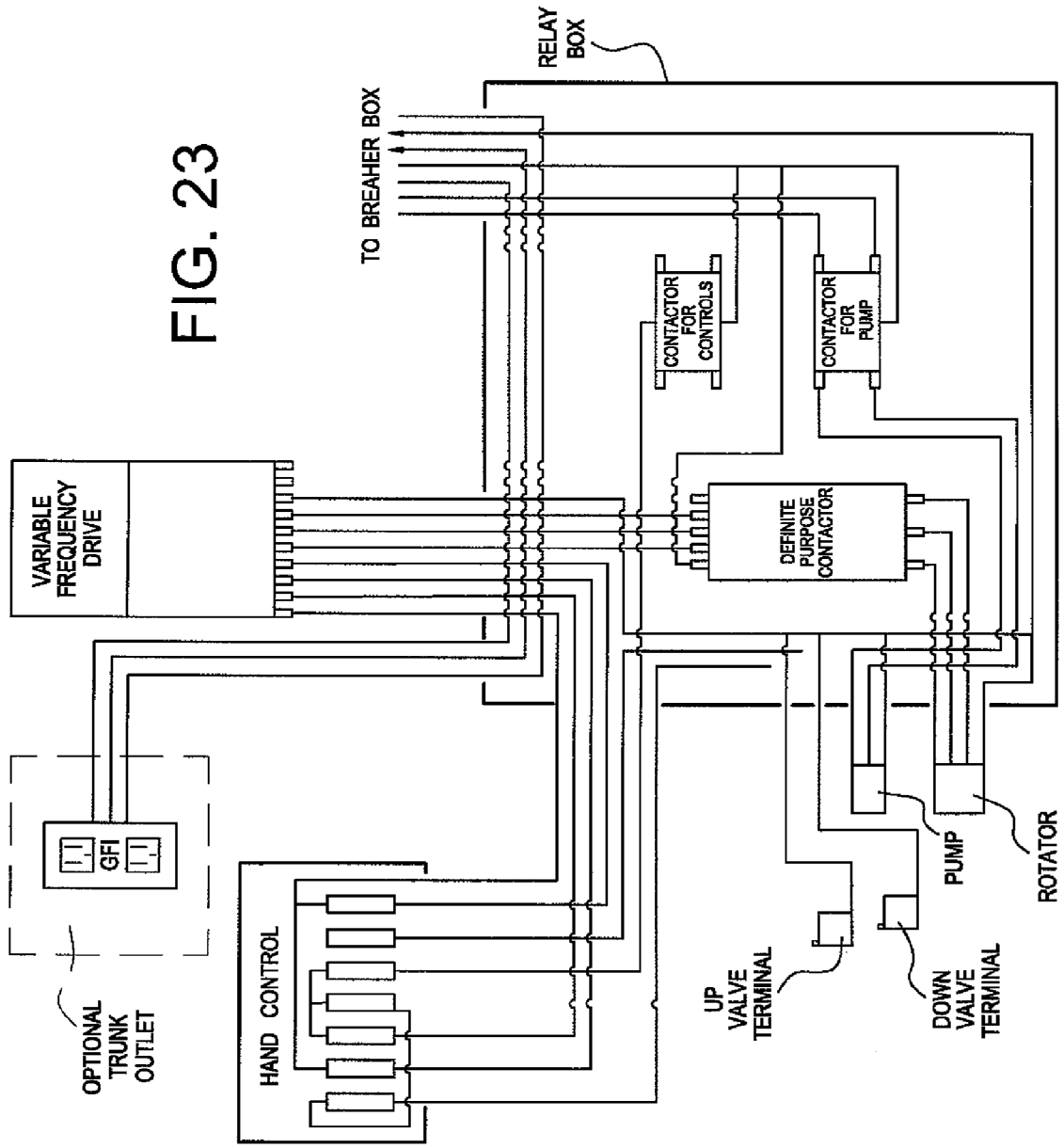
FIG. 23 shows a schematic representation of some of the electrical circuitry of the present invention.

FIG. 23, as explained hereinbelow, shows some of the electrical circuitry of the present invention for operating the various systems thereof. That circuitry easily accommodates the controls to operate the motor-gear sub-system 160. In particular, all that is needed are controls to rotate the motor 161 in a first direction to cause the wing sub-sections 143 or 141 to pivot outwardly to create a large display screen or in an opposite direction to fold the wing sub-sections 141 and 143 to a position analogous to that of the wing sub-section 141 in FIG. 31. When the wing sub-sections 141 and 143 are open, so long as their edges respectively mating with the side edges of the center sub-section 145 are within 1/16 inch of flush, the display screen will display an image over the entirety of the sub-sections 141, 143 and 145 without any invisible lines showing thereon. The hinges, shaft and other elements are specifically designed to accomplish this result. If desired, limit stops may be provided to automatically disengage the motor 161 or a clutch mechanism within the gear housing 163 when the wing sub-sections 141 or 143 have arrived at their extreme orientations, either completely folded up or completely extended. Such limit stops may comprise microswitches on the hinge mechanisms 180 or between the abutting faces of the wing sub-sections on the one hand, and the center sub-section on the other hand.

With reference now to FIGS. 28 and 29 (in comparison to FIGS. 6 and 15), storage of the display screen 140 requires a modified spreader bar 150. In the main modification of the spreader bar 150, as compared to the spreader bar 55, the spreader bar 55 incorporates a single row of couplings 57 because it only receives one screen section, namely, the lower screen half 33 of the screen 30. In contrast, the spreader bar 150 receives for storage the middle screen section 143 and the lower screen section 145. As should be understood from FIGS. 28 and 29, the spreader bar 150 includes two rows of vertically extending fasteners 151 that may, if desired, be threaded rods, and threaded nuts 153 are provided, one for each rod 151. The rods 151 extend through openings in the lower edges of the screen sections 143 and 145 to releasably couple them to the spreader bar.

With reference now to FIGS. 1 and 16-19, the sequence of operation permitting use of the display screen 30 will now be explained.

With reference to FIG. 1, in the position of the lower screen half 33 shown, the lower screen half is coupled to the spreader bar 55 with the posts 59 coupled to the receptacles 63. Additionally, as explained earlier, the upper screen half 31 is coupled to the upper telescoping section 43 by the bracket 45, 47 (FIG. 3). In this orientation, the sequence begins with activation of the telescoping support 35 to lift the upper screen half 31 to the position shown in FIG. 16. The upper screen half 31 is so lifted until its bottom edge is above the top edge of the lower screen half 33. When this orientation is achieved, the pump P (FIG. 9) is activated and the four port reversing valve 82 is moved to the position facilitating extension of the piston rods 75 and 77. When this occurs, the lower screen half 33 is moved with the spreader bar to a position at which it is aligned directly under the upper screen half as clearly shown in FIG. 17. When this has been accomplished, with reference to FIG. 18, the telescoping support 35 is lowered until the lower edge of the upper screen half 33 engages the upper edge of the lower screen half 31 to couple them together. When this occurs, as understood by those of ordinary skill in the art, electrical connections are achieved between the upper screen half and the lower screen half. The upper and lower screen halves are mechanically coupled together by coupling halves like those identified by reference numerals 57 and 63 as explained above.

When mechanical coupling of the upper and lower screen halves has been achieved, the male coupling members 59 on the spreader bar 55 are rotated so that their ears 61 are aligned with the recesses 69 in the female receptacle 63. This unlocks the lower screen half 33 from the spreader bar 55.

Figure 20:
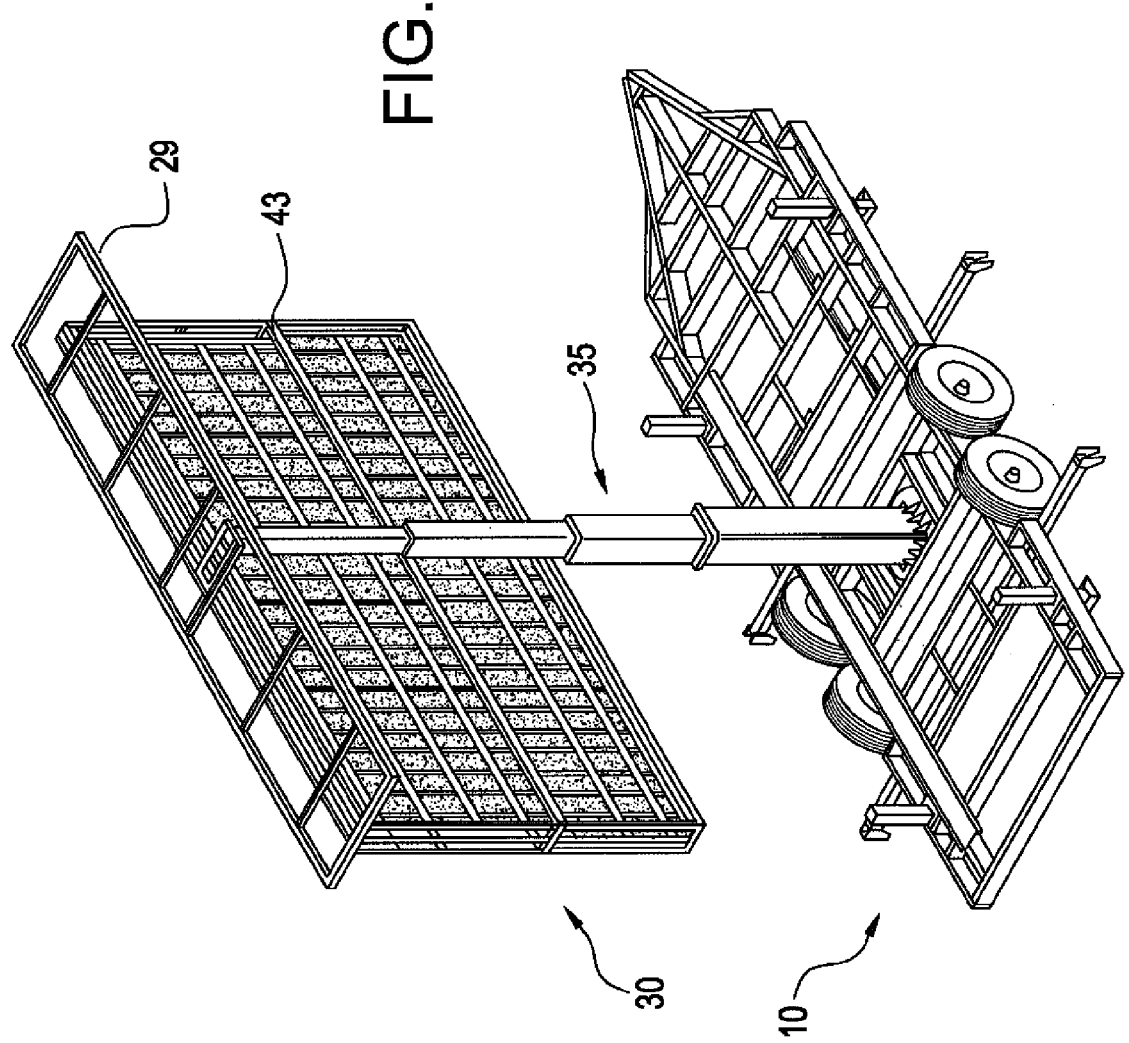
FIG. 20 shows a further view of the display screen and support after it is erected showing more details.

At this point, the telescoping support 35 is activated (FIG. 19) to elevate the integrated display screen 30 to its desired elevation. This is also seen in more detail with reference to FIG. 20.

When it is desired to lower the display screen 30 and store it, the operation is reversed from that which was explained above with reference to FIGS. 1 and 16-19. In so doing, first, the telescoping support 35 is rotated to a position at which the lower edge of the lower screen half 33 is aligned directly over the spreader bar 55. In that orientation, the telescoping support 35 is lowered until the lower screen half female receptacles 63 drop over the posts 59 of the male coupling halves 57. Once this occurs, the posts 59 are rotated 90 degrees to lock the lower screen half 33 onto the spreader bar 55. Once this has occurred, the coupling halves connecting the upper and lower screen halves 31 and 33 are unlocked and the telescoping support 35 is activated to lift the upper screen half 31 off of the lower screen half 33. When this occurs, the electrical connections between the screen halves are also disconnected. Once this has occurred, the cylinders 79 and 81 are activated to retract the piston rods 75 and 77 to move the lower screen half laterally to the position shown in FIG. 1. Thence, the telescoping support 35 is again activated to lower the upper screen half down until its bottom edge rests on the surface 13 of the bed 11, and the roof section 29 closes the roof of the trailer 10. In this position, the trailer may be moved to another location and the sequence reversed.

The above explanation of operation of the present invention concerning storage, assembly, and elevation of the display screen 30 should render understandable the procedures concerning the display screen 140. In this regard, when the display screen 140 is elevated in the position shown in FIG. 30, and it is desired to disassemble and store it, the following procedure is followed:

(1) The sub-sections "a" and "c" are pivoted so that they lie against the sub-sections "b" and also lie in a common plane with respect to one another.

(2) The spreader bar 150 is reciprocated to a position at which the row 155 of threaded rods 151 are aligned below the screen display 140.

(3) The telescoping support 35 is activated to lower the screen display 140 until the holes on the lower edge of the lower screen section 145 are entered by the threaded rods 151 in the row 155 of the spreader bar 150.

(4) The threaded nuts 153 are threaded over the rods 151 to couple the lower screen section 145 to the spreader bar 150.

(5) The lower section 145 is de-coupled from the middle section 143 and the telescoping support 35 is activated to slightly raise the remainder of the screen display 140 encompassing sections 141 and 143.

(6) The spreader bar 150 is then reciprocated to align the row 157 of threaded rods 151 under the middle section 143 of the screen display 140.

(7) The telescoping support 35 is then activated to lower the sections 141 and 143 of the display screen 140 until the holes in the underside of the middle section 143 receive the threaded rods 151.

(8) The nuts 153 are threaded over the rods 151 to fasten the middle screen section 143 to the spreader bar 150.

(9) Thereafter, the middle section 143 is de-coupled from the upper section 141 and the telescoping support 35 is activated to slightly raise the roof section 29 and upper section 141 to provide vertical spacing from the middle section 143 on the spreader bar 150.

(10) Thereafter, the rams 79 and 81 are activated to retract the spreader bar 150 with the sections 143 and 145 fastened thereto.

(11) Thereafter, the roof section 29 and upper section 141 of the screen display 140 are lowered by the telescoping support 35 until the roof section 29 closes the opening in the roof.

(12) In order to erect the screen display 140, steps (1)-(11) set forth above are reversed.

Figure 21:
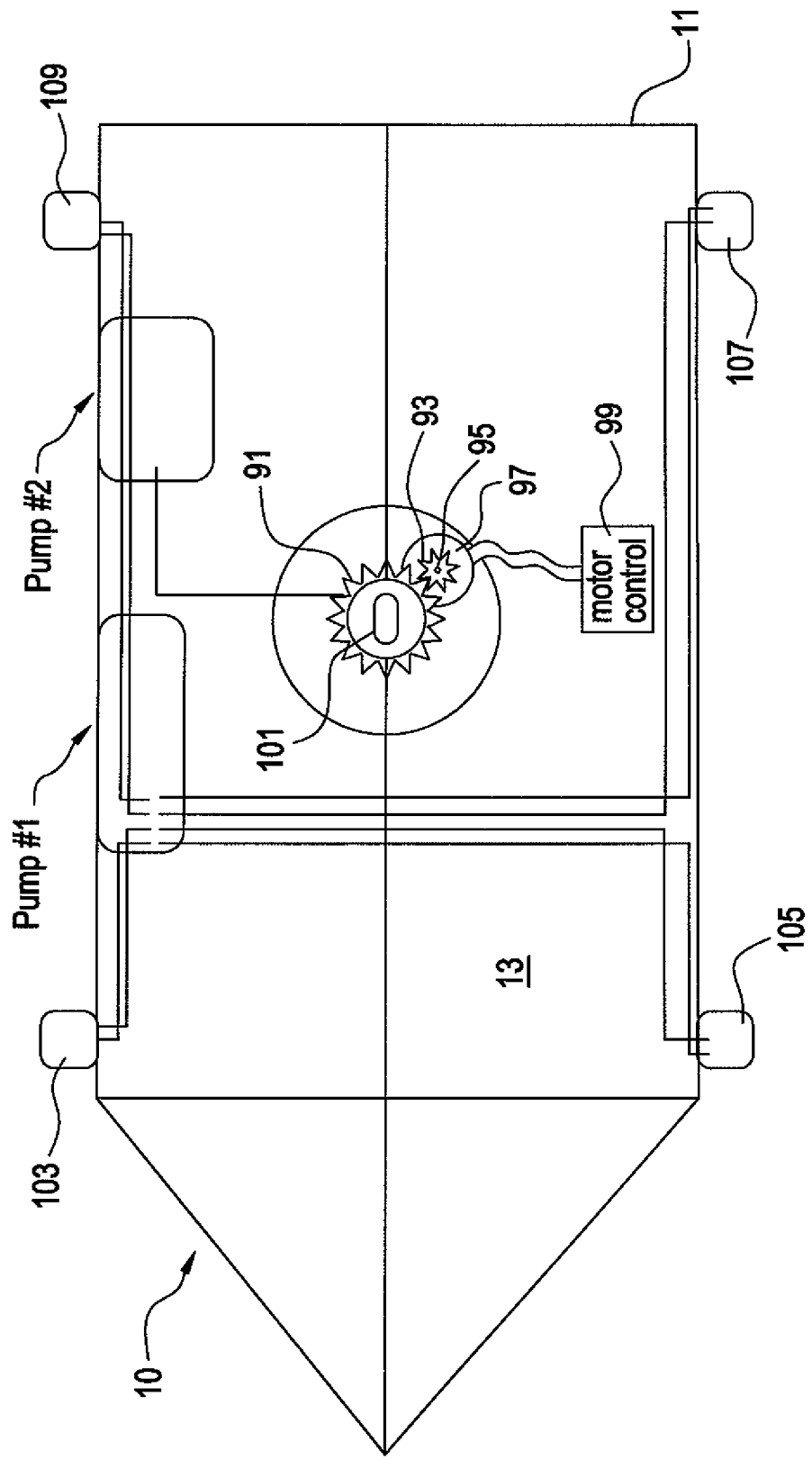
FIG. 21 shows a schematic representation of a leveling mechanism for the trailer as well as the means by which the rotative position of the telescoping support may be adjusted.

With reference to FIG. 21, it is seen that the telescoping support 35 is rotatably mounted on the bed 11 of the trailer 10 and the mounting includes a large gear 91 coupled to a smaller gear 93 mounted on the shaft 95 of a motor 97. A motor control 99 allows the motor 97 shaft 95 to be rotated in either direction to facilitate rotations of the telescoping support 35 and the display screen 30 mounted thereon and constrained to move with the upper support leg 43.

Figure 22:
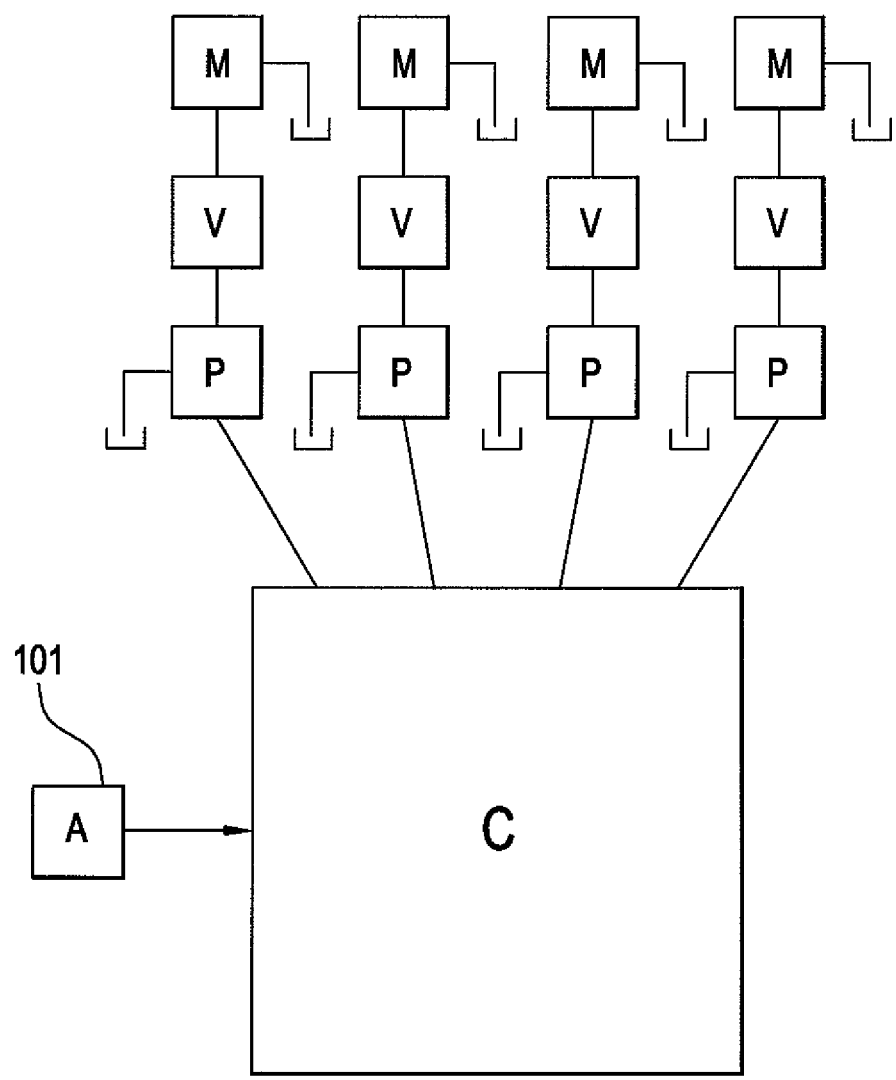
FIG. 22 shows a schematic representation of the electrical and hydraulic circuitry utilized in the automatic leveling mechanism.

FIG. 21 also shows a schematic representation of a leveling mechanism for the trailer 10. The leveling mechanism includes an accelerometer 101 mounted at the center of gravity of the trailer, typically beneath the location of mounting of the telescoping support 35. With reference to FIGS. 21 and 22, each corner of the trailer has mounted thereon an auto-leveling jack 103, 105, 107 and 109, with each such jack including a hydraulic motor M (FIG. 22). The accelerometer 101 sends signals concerning the orientation of the surface 13 of the trailer bed 11 in terms of pitch and yaw, and those signals are received by a computer C (FIG. 22). Responsive to signals received from the accelerometer 101, the computer causes operation of the pumps P and valves V to pump hydraulic fluid through the motors M in one direction or another to cause the jacks to extend or retract as the case may be to automatically level the surface 13 of the trailer bed 11. FIG. 22 shows the pumps receiving hydraulic fluid from sumps schematically shown, and the motors M draining into the same sumps.

FIG. 23 shows a portion of the electrical circuitry of the inventive trailer 10 including hand controls labeled "up" to raise the telescoping support 35, "down" to control lowering of the telescoping support 35, "rotate" to rotate the telescoping support 35, and others. Elevation and lowering of the telescoping support may be accomplished in a manner well known to those of ordinary skill in the art, for example, electrically or hydraulically using racks and pinions, cylinders and pistons, or any other desired mechanism.

As such, an invention has been disclosed in terms of preferred embodiments thereof which fulfill each and every one of the objects of the invention set forth hereinabove, and provides a new and useful trailer with display screen storage and support of great novelty and utility.

Of course, various changes, modifications and alterations in the teachings of the present invention may be contemplated by those of ordinary skill in the art without departing from the intended spirit and scope thereof.

As such, it is intended that the present invention only be limited by the terms of the appended claims.

The invention claimed is:

1. In combination, a trailer and electronic display screen, comprising:
   a) a trailer having a platform and an enclosure enclosing a space above said platform, said enclosure including a roof;
   b) an electronic a display screen comprising at least two sub-modules physically and electrically connectable together along a generally horizontal interface to comprise said display screen and separable along said interface to facilitate storage, said sub-modules comprising at least an upper sub-module and a lower sub-module;
   c) a support mounted on said platform and connectable to said upper sub-module from above, said support being movable between elevated and lowered positions to elevate and lower said upper sub-module, said support comprising a telescoping support including at least two sections, an upper section of which being concentric with a lower section thereof when said upper sub-module is lowered;
   d) said sub-modules being connectable together to form said display screen and liftable by said telescoping support, and said sub-modules being separable for storage side by side on one side of said telescoping support; and
   e) said upper section of said telescoping support having a sub-section of said roof attached thereto and movable therewith, whereby, when said telescoping support is in its lowered position, said sub-section of said roof is aligned with adjacent portions of said roof to substantially seal said enclosure, and said telescoping support may extend linearly upwardly toward said elevated position to linearly lift said sub-section of said roof as well as either said upper sub-module alone or said upper and lower sub-modules when they are interconnected.

2. The combination of claim 1, further including a horizontally movable ram device releasably connectable to said lower sub-module.

3. The combination of claim 2, wherein with said upper sub-module connected to said telescoping support, said telescoping support is movable between said lowered position in which said upper sub-module is resting on said platform and other positions in which said upper sub-module is suspended above said platform.

4. The combination of claim 3, wherein with said telescoping support in one of said other positions at which a lower edge of said upper sub-module is at a higher elevation than an upper edge of said lower sub-module, and with said lower sub-module connected to said ram device, said lower sub-module is movable by said ram device between a first position in which its upper edge is aligned under said lower edge of said upper sub-module, and a second position in which said lower sub-module upper edge is misaligned with said upper sub-module lower edge.

5. The combination of claim 4, wherein with said edges aligned, said telescoping support is operable to lower said upper sub-module until said edges engage, and further including a releasable coupling for assembling said sub-modules together to form said display screen.

6. The combination of claim 4, wherein with said edges misaligned, said telescoping support is operable to lower said upper sub-module until its lower edge engages said platform adjacent said lower sub-module.

7. The combination of claim 1, wherein each sub-module has two sub-sections pivotably connected together.

8. The combination of claim 7, wherein said two sub-sections are pivotable about a vertical shaft.

9. The combination of claim 7, wherein each sub-module has a center sub-section and wing sub-sections to each side thereof, each wing sub-section being mounted on said center sub-section by a vertical shaft.

10. The combination of claim 9, wherein each wing sub-section is movable between a first position overlying a portion of said center sub-section and a second position lying in a common plane with said center sub-section.

11. The combination of claim 10, further including a reversible motor coupled to each vertical shaft and operable to move each of said sub-sections between said first and second positions thereof.

12. The combination of claim 1, wherein said trailer has wheels and a hitch.

13. The combination of claim 4, wherein said ram device has a spreader bar with fasteners releasably fastening said spreader bar to said lower sub-module.

* * * * *